US009383268B2

United States Patent
Higashi et al.

(10) Patent No.: US 9,383,268 B2
(45) Date of Patent: Jul. 5, 2016

(54) STRAIN SENSOR, PRESSURE SENSOR, MICROPHONE, BLOOD PRESSURE SENSOR, PERSONAL DIGITAL ASSISTANT, AND HEARING AID

(71) Applicant: Kabushiki Kaisha Toshiba, Minato-ku (JP)

(72) Inventors: Yoshihiro Higashi, Komatsu (JP); Hideaki Fukuzawa, Kawasaki (JP); Yoshihiko Fuji, Kawasaki (JP); Michiko Hara, Yokohama (JP); Masayuki Kii, Yokohama (JP); Akio Hori, Kawasaki (JP); Tomohiko Nagata, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/472,721

(22) Filed: Aug. 29, 2014

(65) Prior Publication Data

US 2015/0082919 A1    Mar. 26, 2015

(30) Foreign Application Priority Data

Sep. 20, 2013   (JP) .................. 2013-196204

(51) Int. Cl.
*G01L 1/12* (2006.01)
*H04R 19/00* (2006.01)
*H04R 19/04* (2006.01)
*H04R 31/00* (2006.01)

(52) U.S. Cl.
CPC ............... *G01L 1/12* (2013.01); *H04R 19/005* (2013.01); *H04R 19/04* (2013.01); *H04R 31/00* (2013.01)

(58) Field of Classification Search
CPC ..... G01L 9/16; G01L 1/12; A61B 2562/0247; G06F 3/0414
USPC .................................. 73/779, 862.69
See application file for complete search history.

(56) References Cited

U.S. PATENT DOCUMENTS

| | | | |
|---|---|---|---|
| 2006/0023376 A1* | 2/2006 | Gill | G11B 5/3903 360/324.12 |
| 2010/0219822 A1* | 9/2010 | Suzuki | G01D 1/00 324/252 |

(Continued)

FOREIGN PATENT DOCUMENTS

| | | |
|---|---|---|
| JP | 2000-333931 A | 12/2000 |
| JP | 2004-28746 | 1/2004 |

(Continued)

*Primary Examiner* — Max Noori
(74) *Attorney, Agent, or Firm* — Oblon, McClelland, Maier & Neustadt, L.L.P.

(57) ABSTRACT

According to one embodiment, a strain sensor includes: a base; a strain sensing element; a magnetic field sensing element; and a processing unit. The strain sensing element includes a first magnetic layer having a first magnetization; a second magnetic layer having a second magnetization; and a first intermediate layer. In the strain sensing element an angle between a direction of the first magnetization and a direction of the second magnetization changes in accordance with a strain. The magnetic field sensing element includes a third magnetic layer having a third magnetization; a fourth magnetic layer having a fourth magnetization; and a second intermediate layer. In the magnetic field sensing an angle between a direction of the third magnetization and a direction of the fourth magnetization changes in accordance with a magnetic field.

26 Claims, 14 Drawing Sheets

(56) References Cited

U.S. PATENT DOCUMENTS

| | | |
|---|---|---|
| 2011/0295128 A1 | 12/2011 | Yuasa et al. |
| 2012/0245477 A1 | 9/2012 | Giddings et al. |
| 2014/0090486 A1* | 4/2014 | Fuji .................. G01L 9/0044 73/862.69 |

FOREIGN PATENT DOCUMENTS

| | | |
|---|---|---|
| JP | 2009-188858 A | 8/2008 |
| JP | 2011-244938 A | 12/2011 |
| JP | 2012-204479 A | 10/2012 |

* cited by examiner

STRAIN SENSOR, PRESSURE SENSOR, MICROPHONE, BLOOD PRESSURE SENSOR, PERSONAL DIGITAL ASSISTANT, AND HEARING AID

CROSS-REFERENCE TO RELATED APPLICATIONS

This application is based upon and claims the benefit of priority from Japanese Patent Application No. 2013-196204, filed on Sep. 20, 2013; the entire contents of which are incorporated herein by reference.

FIELD

Embodiments described herein relate generally to a strain sensor, a pressure sensor, a microphone, a blood pressure sensor, a personal digital assistant, and a hearing aid.

BACKGROUND

A pressure sensor using a magnetoresistance effect element can sense a pressure change by means of a change in the angle between the magnetization of a magnetization free layer and the magnetization of a reference layer. In such a pressure sensor, an external magnetic field such as the geomagnetic field may influence at least one of the magnetization of the magnetization free layer and the magnetization of the reference layer as external noise.

In personal digital assistants etc. in which a microphone including a pressure sensor using a magnetoresistance effect element is installed, there is a case where the microphone is provided in a position relatively close to a loudspeaker because of the downsizing of the arrangement space etc. Consequently, audio signals may be fed back and echoes may occur.

DETAILED DESCRIPTION

Figure 1:
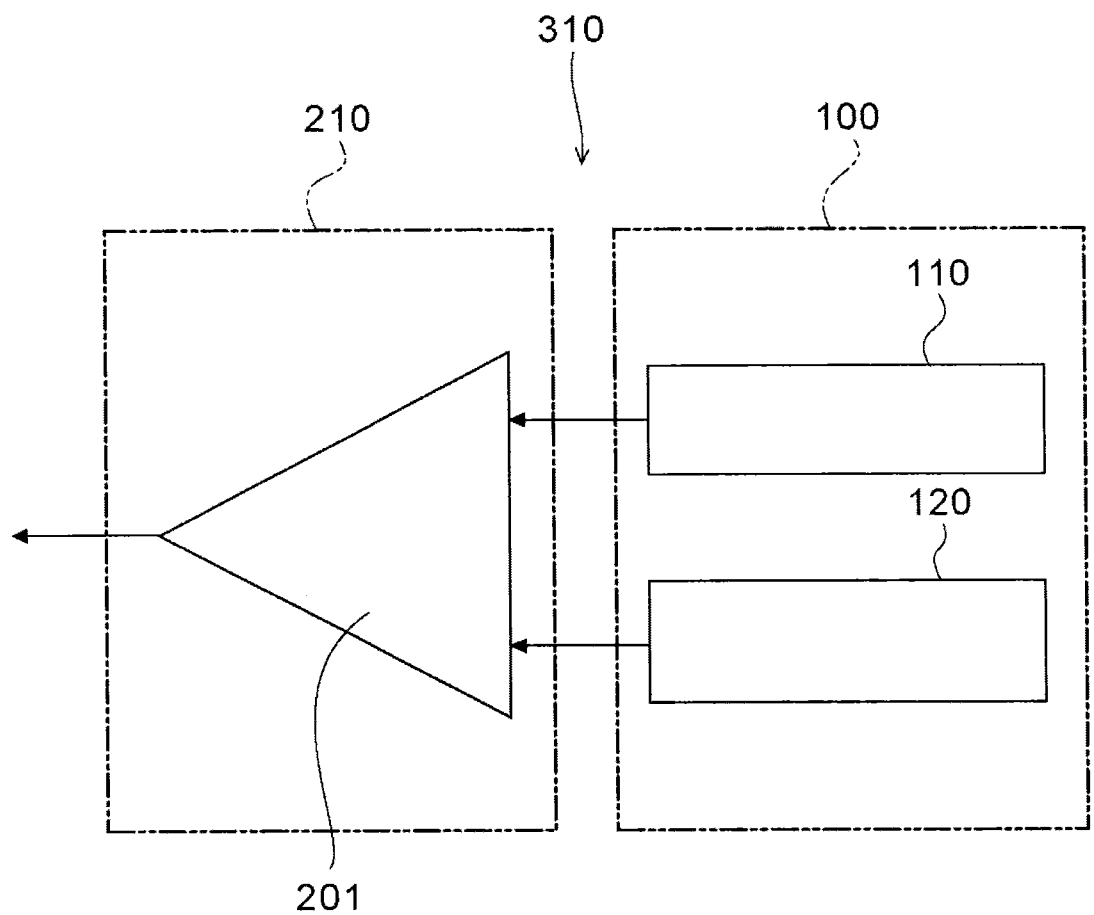
FIG. 1 is a block diagram illustrating a pressure sensor according to an embodiment.

In general, according to one embodiment, a strain sensor includes: a base; a strain sensing element; a magnetic field sensing element; and a processing unit. The base includes a film body capable of being deformed. The strain sensing element is provided on the film body. The strain sensing element includes a first magnetic layer having a first magnetization; a second magnetic layer having a second magnetization; and a first intermediate layer provided between the first magnetic layer and the second magnetic layer. In the strain sensing element an angle between a direction of the first magnetization and a direction of the second magnetization changes in accordance with a strain. The magnetic field sensing element is provided on the base other than the film body. THe magnetic field sensing element includes a third magnetic layer having a third magnetization; a fourth magnetic layer having a fourth magnetization; and a second intermediate layer provided between the third magnetic layer and the fourth magnetic layer. In the magnetic field sensing an angle between a direction of the third magnetization and a direction of the fourth magnetization changes in accordance with a magnetic field. The processing unit is configured to process an output signal of the strain sensing element and an output signal of the magnetic field sensing element.

Hereinbelow, embodiments are illustrated with reference to the drawings.

The drawings are schematic or conceptual; and the proportions of sizes among portions, etc. are not necessarily the same as the actual values thereof. Further, the dimensions and proportions may be illustrated differently among drawings, even for identical portions.

In the specification of this application and the drawings, components similar to those described in regard to a drawing thereinabove are marked with the same reference numerals, and a detailed description is omitted as appropriate.

FIG. 1 is a block diagram illustrating a pressure sensor according to an embodiment.

A pressure sensor 310 according to the embodiment includes a sensing unit 100 and a processing unit 210. The sensing unit 100 includes a strain sensing element 110 and a magnetic field sensing element 120. The strain sensing element 110 and the magnetic field sensing element 120 are a magnetoresistance effect element. The strain sensing element 110 senses pressure and magnetic fields. The magnetic field sensing element 120 senses magnetic fields. The processing unit 210 includes a differential circuit 201. The differential circuit 201 processes the output signal of the strain sensing element 110 and the output signal of the magnetic field sensing element 120.

Figure 2A:
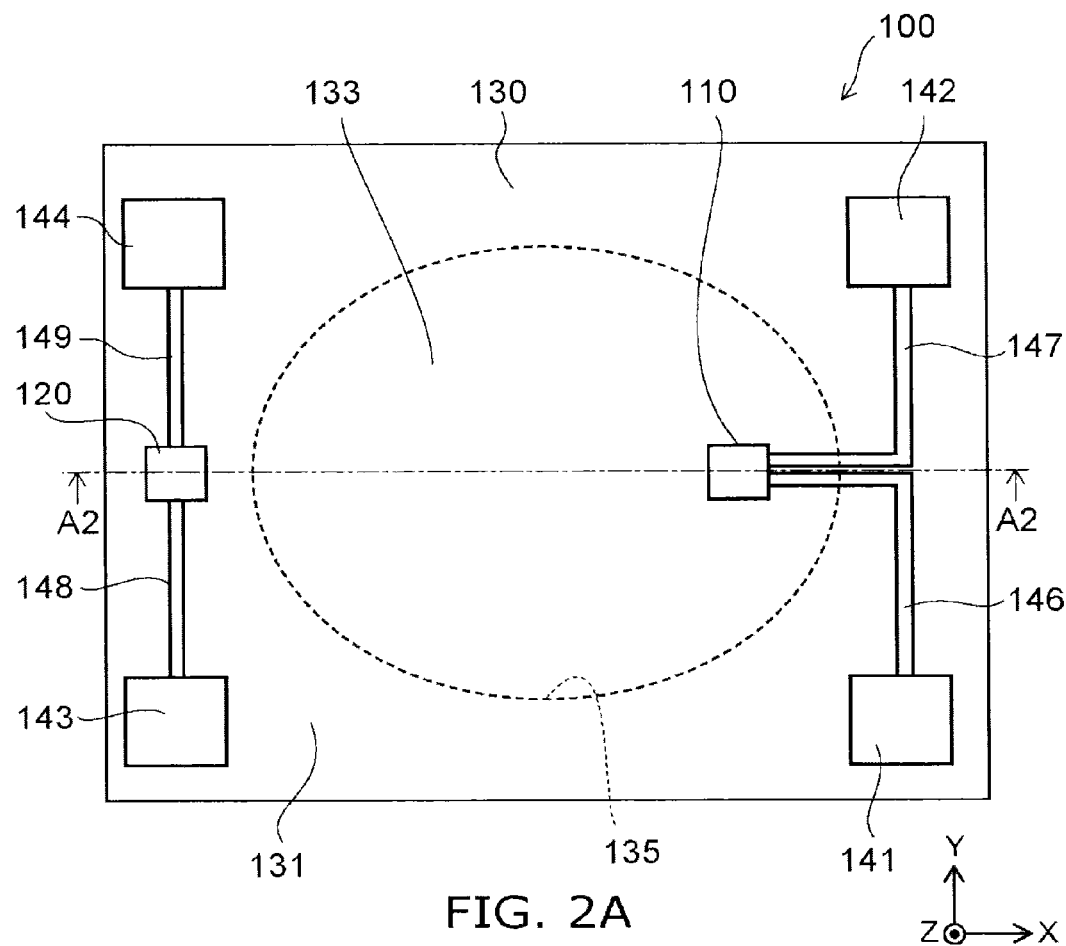
FIG. 2A and FIG. 2B are schematic views showing the sensing unit of the embodiment.
Figure 2B:
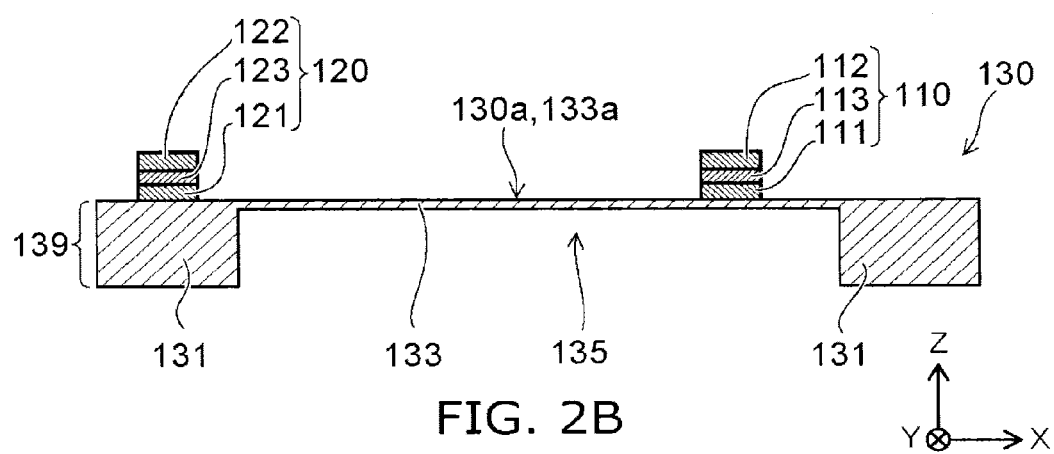

FIG. 2A and FIG. 2B are schematic views showing the sensing unit of the embodiment.

FIG. 2A is a schematic plan view showing the sensing unit of the embodiment. FIG. 2B is a schematic cross-sectional view taken along plane A1-A2 shown in FIG. 2A.

The sensing unit 100 shown in FIG. 2A and FIG. 2B includes the strain sensing element 110, the magnetic field sensing element 120, a base 130, a first electrode pad 141, a second electrode pad 142, a third electrode pad 143, a fourth electrode pad 144, a first interconnection 146, a second interconnection 147, a third interconnection 148, and a fourth interconnection 149.

The base 130 includes a support 131 and a film body 133. The film body 133 is disposed on the inside of the support 131. The base 130 has a first surface 130a. The direction perpendicular to the first surface 130a is defined as the Z-axis direction. One direction perpendicular to the Z-axis direction is defined as the X-axis direction. The direction perpendicular to the Z-axis direction and the X-axis direction is defined as the Y-axis direction.

A membrane 139 is provided in the sensing unit 100, for example. The membrane 139 corresponds to the base 130. A recess 135 is provided in a portion inside the membrane 139. As shown in FIG. 2A, the shape of the recess 135 projected onto the X-Y plane is a circle (including a flat circle), a polygon, or the like, for example. A central portion of the membrane 139 (the thin portion of the membrane 139) forms the film body 133. A peripheral portion of the membrane 139 (the portion thicker than the film body 133 of the membrane 139) forms the support 131. Silicon or the like is used for the membrane 139, for example. The embodiment is not limited thereto, and the material of the membrane 139 is arbitrary.

The strain sensing element 110 is provided on the film body 133 of the membrane 139. The magnetic field sensing element 120 is provided on the support 131 of the membrane 139. In other words, the magnetic field sensing element 120 is provided on the outside of the film body 133.

The membrane 139 plays a role like an eardrum that makes the conversion from pressure to strain. The strain sensing element 110 provided on the film body 133 of the membrane 139 can read strain to make pressure sensing. A single-crystal Si (silicon) substrate is used as the membrane 139, for example. Etching is performed from the back surface of the single-crystal Si substrate to thin the portion where the strain sensing element 110 is disposed (the portion of the film body 133). Thereby, a diaphragm (the film body 133) is formed. The diaphragm is deformed in accordance with the applied pressure.

When the shape of the diaphragm projected onto the X-Y plane is a geometrically isotropic shape, the strain generated by the displacement of the diaphragm has the same value in the X-Y plane in the vicinity of the geometric center, for example. Therefore, when the strain sensing element 110 is disposed on the geometric center of the diaphragm, the strain that causes the rotation of magnetization is isotropic. Consequently, the magnetization of a magnetic layer does not rotate, and a change in the resistance value of the element does not occur. Hence, in the embodiment, it is preferable that the strain sensing element 110 not be disposed on the geometric center of the diaphragm. When the shape of the diaphragm projected onto the X-Y plane is a circle, the largest anisotropic strain is generated in the vicinity of the outer periphery of the circle due to the displacement of the diaphragm, for example. Therefore, when the strain sensing element 110 is disposed in the vicinity of the outer periphery of the diaphragm, the sensitivity of the sensing unit 100 is increased.

The film body 133 is a film having flexibility. The film body 133 is flexible in the direction perpendicular to the film surface 133a. The film body 133 bends when an external pressure is applied, and generates a strain in the strain sensing element 110 provided on the film body 133. In other words, the film body 133 generates a strain in accordance with the pressure. As the external pressure, pressure caused by sound waves, ultrasonic waves, pressing force, or the like is given, for example. As described later, the pressure sensor 310 is used for blood pressure sensors etc., for example. The film body 133 can be used also for a mode like expansion and contraction.

The film body 133 is formed of an insulating material, for example. The film body 133 contains silicon oxide, silicon nitride, or the like, for example. The film body 133 may be formed of a semiconductor material such as silicon. The film body 133 may be formed of a metal material or the like, for example.

The support 131 is formed of the same material as the material of the film body 133, for example. Alternatively, the support 131 may be formed of a material different from the material of the film body 133, for example. The support 131 is formed of a semiconductor such as silicon or an insulating material, for example.

The inside of the recess 135 (the hollow portion) is in a vacuum state (a low pressure state lower than one atmosphere), for example. Alternatively, the interior of the recess 135 may be filled with a gas such as air and an inert gas or a liquid. That is, the recess 135 needs only to have a structure by which the film body 133 can bend.

As shown in FIG. 2B, the strain sensing element 110 includes a first magnetic layer 111, a second magnetic layer 112, and a first intermediate layer 113. The magnetic field sensing element 120 includes a third magnetic layer 121, a fourth magnetic layer 122, and a second intermediate layer 123. The strain sensing element 110 and the magnetic field sensing element 120 are described later in detail.

The first electrode pad 141 is electrically connected to the first magnetic layer 111 of the strain sensing element 110 via the first interconnection 146. The second electrode pad 142 is electrically connected to the second magnetic layer 112 of the strain sensing element 110 via the second interconnection 147. The third electrode pad 143 is electrically connected to the third magnetic layer 121 of the magnetic field sensing element 120 via the third interconnection 148. The fourth electrode pad 144 is electrically connected to the fourth magnetic layer 122 of the magnetic field sensing element 120 via the fourth interconnection 149.

The direction of the current passed through the strain sensing element 110 may be the direction from the first magnetic layer 111 toward the second magnetic layer 112 or the direction from the second magnetic layer 112 toward the first magnetic layer 111. The direction of the current passed through the magnetic field sensing element 120 may be the direction from the third magnetic layer 121 toward the fourth magnetic layer 122 or the direction from the fourth magnetic layer 122 toward the third magnetic layer 121.

Figure 3A:
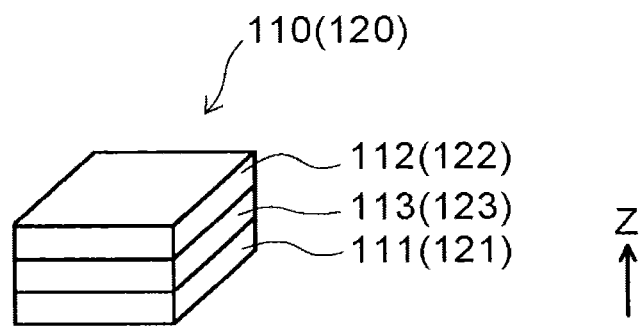
FIG. 3A to FIG. 3C are schematic perspective views illustrating strain sensing elements and magnetic field sensing elements of embodiments.
Figure 3B:
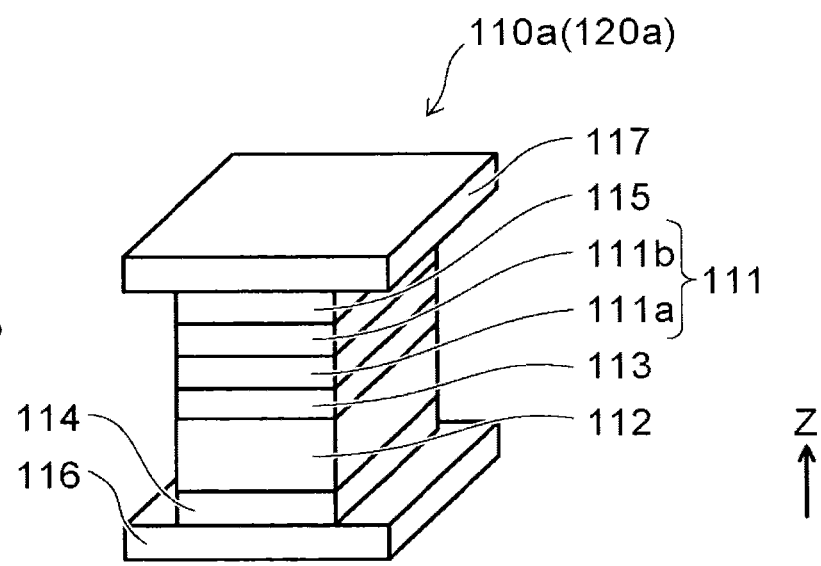
Figure 3C:
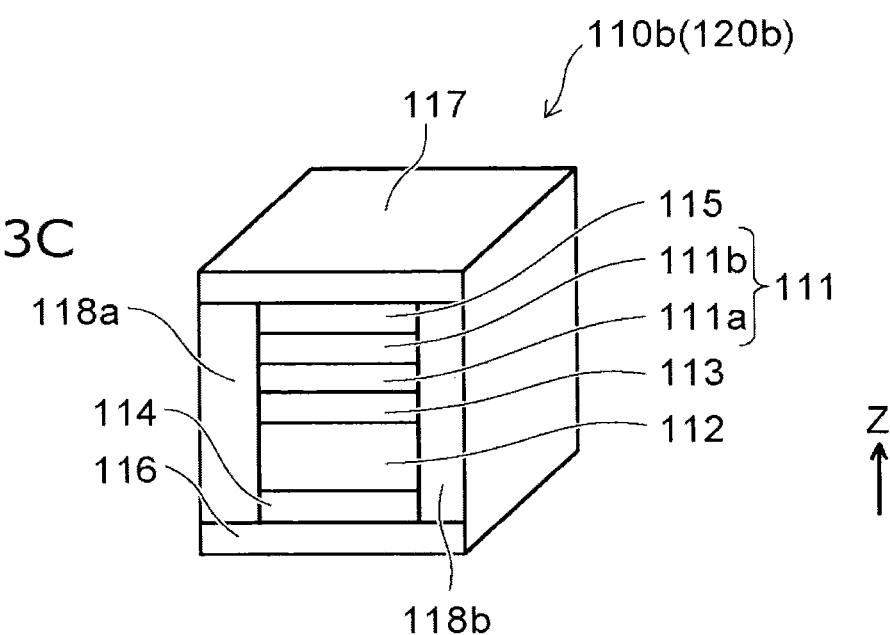

FIG. 3A to FIG. 3C are schematic perspective views illustrating strain sensing elements and magnetic field sensing elements of embodiments.

FIG. 3A is a schematic perspective view illustrating the strain sensing element and the magnetic field sensing element of the embodiment. FIG. 3B is a schematic perspective view illustrating a strain sensing element and a magnetic field sensing element of another embodiment. FIG. 3C is a schematic perspective view illustrating a strain sensing element and a magnetic field sensing element of yet another embodiment.

The magnetic field sensing element 120 has a configuration similar to the configuration of the strain sensing element 110. That is, the third magnetic layer 121 corresponds to the first magnetic layer 111. The fourth magnetic layer 122 corresponds to the second magnetic layer 112. The second intermediate layer 123 corresponds to the first intermediate layer 113. A magnetic field sensing element 120a has a configuration similar to the configuration of a strain sensing element 110a. A magnetic field sensing element 120b has a configuration similar to the configuration of a strain sensing element 110b. Herein, the strain sensing elements 110, 110a, and 110b are described as examples.

As shown in FIG. 3A, the strain sensing element 110 includes the first magnetic layer 111, the second magnetic layer 112, and the intermediate layer 113. The second magnetic layer 112 is provided apart from the first magnetic layer 111 in the Z-axis direction. The intermediate layer 113 is provided between the first magnetic layer 111 and the second magnetic layer 112.

The first magnetic layer 111 and the second magnetic layer 112 are a magnetization free layer. Alternatively, one of the first magnetic layer 111 and the second magnetic layer 112 may be a reference layer. In this case, the other of the first magnetic layer 111 and the second magnetic layer 112 is a magnetization free layer. In the magnetization free layer, the direction of the magnetization is easily changed by an external magnetic field. The direction of the magnetization of the reference layer is less easily changed than the direction of the magnetization of the magnetization free layer, for example. The reference layer is a pinned layer, for example.

The first magnetic layer 111 and the second magnetic layer 112 are formed of a material with a large absolute value of magnetostriction constant. The absolute value of the magnetostriction constant can be changed by the type of the material, additive elements, etc. The absolute value of the magnetostriction constant can be greatly changed also by the material, configuration, etc. of a nonmagnetic layer formed adjacent to the magnetic layer, not by the magnetic material itself. The absolute value of the magnetostriction constant is larger than $10^{-2}$, for example. The absolute value of the magnetostriction constant is preferably larger than $10^{-5}$, for example.

When the absolute value of the magnetostriction constant is increased, the amount of change in magnetization direction in accordance with the change in stress can be increased.

For the first magnetic layer 111 and the second magnetic layer 112, a material having a magnetostriction constant with the plus sign or a material having a magnetostriction constant with the minus sign may be used. The absolute value of the magnetostriction constant of the first magnetic layer 111 is different from the absolute value of the magnetostriction constant of the second magnetic layer 112.

As the material of the first magnetic layer 111 and the second magnetic layer 112, at least one of Fe, Co, and Ni or an alloy containing at least one of them is given, for example. An additive element may be added to these materials.

To these metals and alloys, B, Al, Si, Mg, C, Ti, V, Cr, Mn, Cu, Zn, Ga, Zr, Hf, or the like may be added as an additive element or an ultrathin layer.

As the first magnetic layer 111 and the second magnetic layer 112, not only a crystalline magnetic layer but also an amorphous magnetic layer may be used.

As the first magnetic layer 111 and the second magnetic layer 112, also a magnetic layer of an oxide or a nitride may be used.

As the material of the first magnetic layer 111 and the second magnetic layer 112, FeCo alloy, NiFe alloy, and the like are given, for example. As the material of the first magnetic layer 111 and the second magnetic layer 112, Fe—Co—Si alloy, Fe—Co—Si—B alloy, a Tb-M-Fe alloy exhibiting λs>100 ppm (M being Sm, Eu, Gd, Dy, Ho, or Er), a Tb-M1-Fe-M2 alloy (M1 being Sm, Eu, Gd, Dy, Ho, or Er; M2 being Ti, Cr, Mn, Co, Cu, Nb, Mo, W, or Ta), an Fe-M3-M4-B alloy (M3 being Ti, Cr, Mn, Co, Cu, Nb, Mo, W, or Ta; M4 being Ce, Pr, Nd, Sm, Tb, Dy, or Er), Ni, Al—Fe, a ferrite ($Fe_3O_4$, $(FeCo)_3O_4$, or the like), and the like are given, for example.

Each of the first magnetic layer 111 and the second magnetic layer 112 may have a two-layer structure.

The first magnetic layer 111 and the second magnetic layer 112 may include a layer containing FeCo (for example, a layer of CoFe or an alloy containing CoFe) and the following layer stacked with the layer containing FeCo, for example.

The layer stacked with the layer containing FeCo is formed of Fe—Co—Si—B alloy, a Tb-M-Fe alloy exhibiting λs>100 ppm (M being Sm, Eu, Gd, Dy, Ho, or Er), a Tb-M1-Fe-M2 alloy (M1 being Sm, Eu, Gd, Dy, Ho, or Er; M2 being Ti, Cr, Mn, Co, Cu, Nb, Mo, W, or Ta), an Fe-M3-M4-B alloy (M3 being Ti, Cr, Mn, Co, Cu, Nb, Mo, W, or Ta; M4 being Ce, Pr, Nd, Sm, Tb, Dy, or Er), Ni, Al—Fe, a ferrite ($Fe_3O_4$, $(FeCo)_3O_4$, or the like), or the like.

The first intermediate layer 113 is a nonmagnetic layer.

The first intermediate layer 113 is formed of a metal material, an insulating material, or others, for example.

As the metal material, Cu, Au, Ag, and the like are given, for example.

As the insulating material, a magnesium oxide (MgO etc.), an aluminum oxide ($Al_2O_3$ etc.), a titanium oxide (TiO etc.), a zinc oxide (ZnO etc.), and the like are given, for example.

When the first intermediate layer 113 is formed using a metal material, the giant magneto-resistive (GMR) effect is exhibited.

When the first intermediate layer 113 is formed using an insulating material, the tunnel magneto-resistance (TMR) effect is exhibited.

In the pressure sensor 310, CPP-GMR (current-perpendicular-to-plane giant magneto resistance) in which a current is passed along the stacking direction of the strain sensing element 110 is used. The pressure sensor is also referred to as a strain sensor.

The first intermediate layer 113 may have a CCP (current-confined-path) structure in which a plurality of metal current paths penetrating through an insulating layer in the layer thickness direction are provided. Also in this case, CPP-GMR is used in the pressure sensor 310.

There is a case where the first magnetic layer 111 formed of a material having a positive magnetostriction constant is provided on the first intermediate layer 113 containing an oxide such as a magnesium oxide. A layer in which a layer made of CoFeB, a layer made of CoFe, and a layer made of NiFe are stacked may be used as the first magnetic layer 111, for example. If in such a case the ratio of Ni in the uppermost layer made of NiFe is increased, the magnetostriction constant of the layer made of NiFe becomes negative. Further, the absolute value of the magnetostriction constant is increased. The negative magnetostriction constant may cancel the positive magnetostriction on the first intermediate layer 113. Hence, the ratio of nickel in the uppermost layer made of NiFe is preferably lower than the ratio of nickel in a layer made of $Ni_{81}Fe_{19}$ commonly used. The ratio of nickel in the uppermost layer made of NiFe is preferably less than 80 atomic percent (atomic %), for example.

As shown in FIG. 3B, the strain sensing element 110a of the another embodiment further includes a buffer layer 114, a cap layer 115, a first electrode 116, and a second electrode 117, as compared to the strain sensing element 110 described above in regard to FIG. 3A.

The second electrode 117 is provided apart from the first electrode 116 in the Z-axis direction. The cap layer 115 is provided between the first electrode 116 and the second electrode 117. The first magnetic layer 111 is provided between the first electrode 116 and the cap layer 115. The first intermediate layer 113 is provided between the first electrode 116 and the first magnetic layer 111. The second magnetic layer 112 is provided between the first electrode 116 and the first intermediate layer 113. The buffer layer 114 is provided between the first electrode 116 and the second magnetic layer 112.

The first electrode 116 and the second electrode 117 are formed of a nonmagnetic material having electrical conductivity. In this case, the first electrode 116 and the second electrode 117 are formed of Au, Cu, Ta, Al, or the like, for example.

Alternatively, the first electrode 116 and the second electrode 117 are formed of a soft magnetic material having electrical conductivity. The first electrode 116 and the second electrode 117 can, when formed of a soft magnetic material, reduce the magnetic noise from the outside. In this case, the first electrode 116 and the second electrode 117 are formed of permalloy (NiFe alloy), silicon steel (FeSi alloy), or the like, for example.

The buffer layer 114 is an amorphous layer containing Ta, Ti, or the like, for example. The buffer layer 114 may serve also as a seed layer for the promotion of crystal orientation. In the case where the buffer layer 114 serves also as a seed layer for the promotion of crystal orientation, the buffer layer 114 is a layer formed of Ru, NiFe, or the like. The buffer layer 114 may have a structure in which layers formed of Ru, NiFe, and/or the like are stacked.

The second magnetic layer 112 and the first intermediate layer 113 are as described above in regard to FIG. 3A.

The first magnetic layer 111 has a two-layer structure. The first magnetic layer 111 includes a magnetic stacked film 111a and a high magnetostriction magnetic film 111b.

The magnetic stacked film 111a increases the rate of change of the magnetoresistance effect. The magnetic stacked film 111a is formed of layers containing cobalt, iron, nickel, and/or the like, for example. A CoFeB layer or the like is given as the magnetic stacked film 111a, for example.

The high magnetostriction magnetic film 111b is provided between the magnetic stacked film 111a and the cap layer 115. The high magnetostriction magnetic film 111b is formed of Fe—Co—Si—B alloy or the like, for example.

As shown in FIG. 3C, the strain sensing element 110b of the yet another embodiment further includes a first insulating layer 118a and a second insulating layer 118b, as compared to the strain sensing element 110a described above in regard to FIG. 3B. The first insulating layer 118a is provided on the side wall of the stacked body including the buffer layer 114, the second magnetic layer 112, the first intermediate layer 113, the first magnetic layer 111, and the cap layer 115. The second insulating layer 118b is provided apart from the first insulating layer 118a in a direction perpendicular to the Z-axis. The stacked body is provided between the first insulating layer 118a and the second insulating layer 118b.

The first insulating layer 118a and the second insulating layer 118b are formed of an aluminum oxide (for example, $Al_2O_3$), a silicon oxide (for example, $SiO_2$), or the like, for example.

The installation of the first insulating layer 118a and the second insulating layer 118b can suppress leakage current flowing around.

FIG. 4A to FIG. 5C are schematic perspective views describing the operation of the strain sensing element of the embodiment.

Figure 4A:
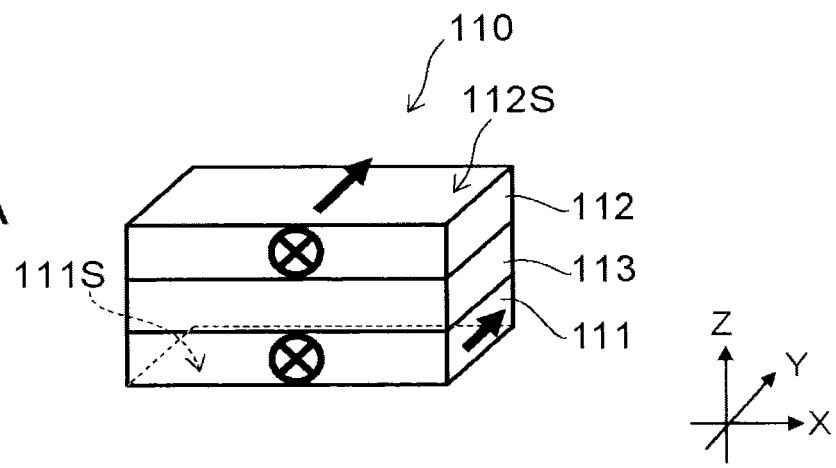
FIG. 4A to FIG. 4C are schematic perspective views describing the operation of the strain sensing element of the embodiment.
Figure 4B:
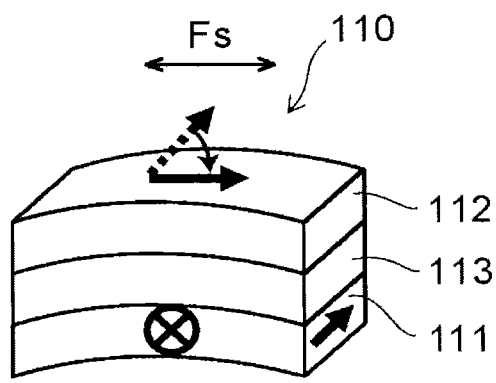
Figure 4C:
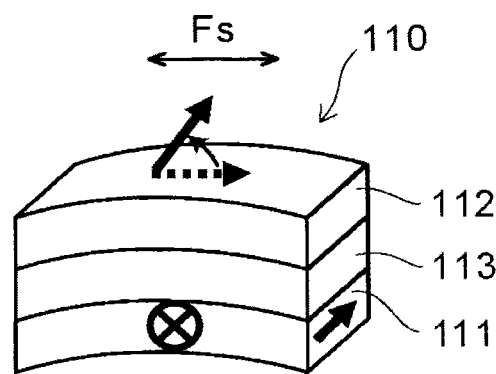

FIG. 4A to FIG. 4C show examples of the in-plane magnetization system.

Figure 5A:
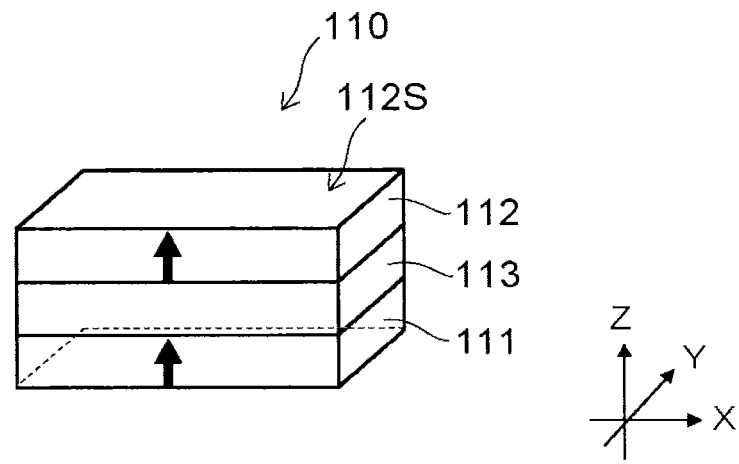
FIG. 5A to FIG. 5C are schematic perspective views describing the operation of the strain sensing element of the embodiment.
Figure 5B:
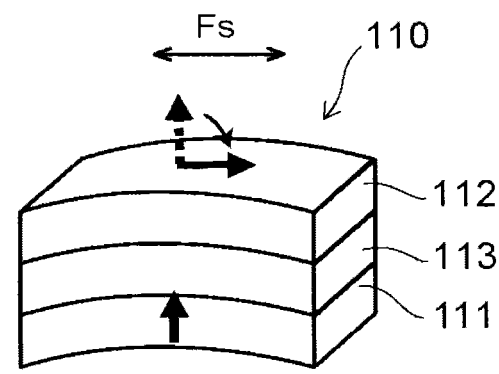
Figure 5C:
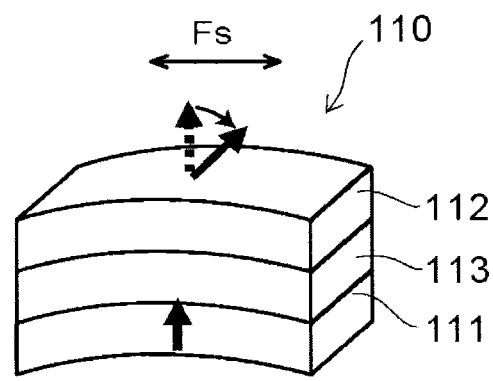

FIG. 5A to FIG. 5C show examples of the perpendicular magnetization system.

FIG. 4A and FIG. 5A illustrate a state of the strain sensing element 110 when no stress is applied. FIG. 4B and FIG. 5B illustrate a state of the strain sensing element 110 when a tensile stress is applied when the strain sensing element 110 has a positive magnetostriction constant. FIG. 4C and FIG. 5C illustrate a state of the strain sensing element 110 when a tensile stress is applied when the strain sensing element 110 has a negative magnetostriction constant.

The sensing unit 100 includes a spin valve film formed of a stacked film of ultrathin magnetic films, for example. The resistance of the spin valve film is changed by an external magnetic field. The amount of change in resistance is the MR ratio. The MR phenomenon results from various physical effects. The MR phenomenon is based on the giant magnetoresistance effect or the tunneling magnetoresistance effect, for example.

The spin valve film has a configuration in which at least two ferromagnetic layers are stacked via a spacer layer. The magnetoresistance state of the spin valve film is determined by the relative angle between the magnetization directions of the two ferromagnetic layers. In the state where the magnetizations of the two ferromagnetic layers are parallel to each other, the resistance of the spin valve film is in a low state, for example. In the antiparallel state, the parallelism of the spin valve film is in a high state. When the angle between the magnetizations of the two ferromagnetic layers is an intermediate angle, a state of an intermediate resistance is obtained.

Of the at least two magnetic layers, the magnetic layer in which the magnetization rotates easily is a magnetization free layer, for example. The magnetic layer in which the magnetization changes less easily is a reference layer.

Herein, the case where the first magnetic layer 111 is a reference layer and the second magnetic layer 112 is a magnetization free layer is described as an example. The first magnetic layer 111 has a first surface 111s. The second magnetic layer 112 has a second surface 112s.

The magnetization direction of a magnetic layer is changed also by an external stress. By using this phenomenon, the spin valve film is used as a strain sensing element or a strain sensing element. The change in magnetization of the magnetization free layer caused by a strain is based on the inverse magnetostriction effect, for example.

The magnetostriction effect is a phenomenon in which the strain of a magnetic material changes when the magnetization of the magnetic material is changed. The magnitude of the strain changes depending on the magnitude and direction of the magnetization. The magnitude of the strain can be controlled through parameters of the magnitude and direction of the magnetization. The amount of change in strain of which the amount saturates when the strength of the applied magnetic field is increased is the magnetostriction constant $\lambda s$. The magnetostriction constant depends on the characteristics proper to the magnetic material. The magnetostriction constant ($\lambda s$) represents the magnitude of the deformation when an external magnetic field is applied and a magnetic layer is magnetically saturated in a certain direction. Assuming that the length in a state where there is no external magnetic field is L, when the length has changed by $\Delta L$ when an external magnetic field is applied, the magnetostriction constant $\lambda s$ is expressed by $\Delta L/L$. Although the amount of change varies with the magnitude of the external magnetic field, the magnetostriction constant $\lambda s$ is expressed as $\Delta L/L$ in a state where a sufficient external magnetic field is applied and magnetization is saturated. In the embodiment, the absolute value of the magnetostriction constant $\lambda s$ is preferably $10^{-5}$ or more. Thereby, a strain is generated by a stress efficiently, and the sensing sensitivity of pressure is enhanced. The absolute value of the magnetostriction constant is $10^{-2}$ or less, for example. This value is the upper limit of the value of practical materials in which the magnetistriction effect occurs.

There is inverse magnetostriction effect as the opposite phenomenon to the magnetostriction effect. In the inverse magnetostriction effect, the magnetization of a magnetic material changes when an external stress is applied. The magnitude of the change depends on the magnitude of the external stress and the magnetostriction constant of the magnetic material. Since the magnetostriction effect and the inverse magnetostriction effect are effects physically symmetrical to each other, the magnetostriction constant of the inverse magnetostriction effect is the same as the magnetostriction constant in the magnetostriction effect.

In the magnetostriction effect and the inverse magnetostriction effect, there are positive magnetostriction constants and negative magnetostriction constants. These constants depend on the magnetic material. In the case of materials having a positive magnetostriction constant, the magnetization changes so as to run along the direction in which a tensile strain is applied. In the case of materials having a negative magnetostriction constant, the magnetization changes so as to run along the direction in which a compressive strain is applied.

By the inverse magnetostriction effect, the magnetization direction of the magnetization free layer of the spin valve film can be changed. When an external stress is applied, the magnetization direction of the magnetization free layer changes due to the inverse magnetostriction effect, and accordingly a difference occurs in the relative magnetization angle between the reference layer and the magnetization free layer. Thereby, the resistance of the spin valve film is changed. Thereby, the spin valve film can be used as a strain sensing element.

As shown in FIG. 4A, in the strain sensing element 110 of the embodiment, the first magnetic layer 111 (a reference layer), the first intermediate layer 113, and the second magnetic layer 112 (a magnetization free layer) are stacked in this order. In the specification of this application, "stack" includes not only the state of being stacked in contact with each other but also the state of being stacked via another component.

The first magnetic layer 111 has a first magnetization. In the strain sensing element 110 shown in FIG. 4A to FIG. 4C, the direction of the first magnetization is parallel to the X-Y plane. The second magnetic layer 112 has a second magnetization. In the strain sensing element 110 shown in FIG. 4A to FIG. 4C, the direction of the second magnetization is parallel to the X-Y plane. In other words, the direction of the first magnetization is perpendicular to the Z-axis direction (stacking direction). The direction of the second magnetization is perpendicular to the Z-axis direction. The configuration using this state is referred to as an "in-plane magnetization system." In the in-plane magnetization system, an in-plane magnetization film is used as the first magnetic layer 111. In the in-plane magnetization system, an in-plane magnetization film is used as the second magnetic layer 112.

The embodiment is not limited thereto, and the angle between the direction of the first magnetization and the direction parallel to the X-Y plane (the first surface 111s) is smaller than 45 degrees. The angle between the direction of the second magnetization and the direction parallel to the X-Y plane (the second surface 112s) is smaller than 45 degrees.

When the magnetostriction constant of a magnetic layer is positive, the magnetization easy axis of the magnetic layer is parallel to the direction in which a tensile stress is applied. When the magnetostriction constant of a magnetic layer is negative, the magnetization easy axis of the magnetic layer is perpendicular to the direction in which a tensile stress is applied.

As shown in FIG. 4A, when no stress is applied, the direction of the magnetization of the second magnetic layer 112 is parallel to the direction of the magnetization of the first magnetic layer 111, for example. In this example, the direction of the magnetization runs along the Y-axis direction.

As shown in FIG. 4B, when a tensile stress Fs is applied along the X-axis direction, the magnetization of the second magnetic layer 112 rotates toward the X-axis direction due to the inverse magnetostriction effect of a positive magnetostriction constant, for example. When the magnetization of the first magnetic layer 111 is fixed, the relative angle between the direction of the magnetization of the second magnetic layer 112 and the direction of the magnetization of the first magnetic layer 111 changes. The electric resistance of the strain sensing element 110 changes in accordance with the change in relative angle.

As shown in FIG. 4C, when a tensile stress Fs is applied along the X-axis direction, the magnetization of the second magnetic layer 112 rotates toward the Y-axis direction due to the inverse magnetostriction effect of a negative magnetostriction constant, for example. Also in this case, the relative angle between the direction of the magnetization of the second magnetic layer 112 and the direction of the magnetization of the first magnetic layer 111 changes due to the application of the tensile stress Fs. The electric resistance of the strain sensing element 110 changes in accordance with the change in relative angle.

In the strain sensing element 110 shown in FIG. 5A to FIG. 5C, the direction of the first magnetization is perpendicular to the X-Y plane. In the strain sensing element 110 shown in FIG. 5A to FIG. 5C, the direction of the second magnetization is perpendicular to the X-Y plane. In other words, the direction of the first magnetization is parallel to the Z-axis direction. The direction of the second magnetization is parallel to the Z-axis direction. The configuration using this state is referred to as a "perpendicular magnetization system." In the perpendicular magnetization system, a perpendicular magnetization film is used as the first magnetic layer 111. In the perpendicular magnetization system, a perpendicular magnetization film is used as the second magnetic layer 112.

The embodiment is not limited thereto, and the angle between the direction of the magnetization of the first magnetic layer 111 and the direction parallel to the X-Y plane (the first surface 111s) is larger than 45 degrees. The angle between the direction of the magnetization of the second magnetic layer 112 and the direction parallel to the X-Y plane (the second surface 112s) is larger than 45 degrees.

As shown in FIG. 5A, when no stress is applied, the direction of the magnetization of the second magnetic layer 112 is parallel to the direction of the magnetization of the first magnetic layer 111, for example. In this example, the direction of the magnetization runs along the Z-axis direction.

As shown in FIG. 5B, when a tensile stress Fs is applied along the X-axis direction, the magnetization of the second magnetic layer 112 rotates toward the X-axis direction due to the inverse magnetostriction effect of a positive magnetostriction constant, for example. The relative angle between the direction of the magnetization of the second magnetic layer 112 and the direction of the magnetization of the first magnetic layer 111 changes. The electric resistance of the strain sensing element 110 changes in accordance with the change in relative angle.

As shown in FIG. 5C, when a tensile stress Fs is applied along the X-axis direction, the magnetization of the second magnetic layer 112 rotates toward the Y-axis direction due to the inverse magnetostriction effect of a negative magnetostriction constant, for example. The relative angle between the direction of the magnetization of the second magnetic layer 112 and the direction of the magnetization of the first magnetic layer 111 changes due to the application of the tensile stress Fs. The electric resistance of the strain sensing element 110 changes in accordance with the change in relative angle.

The strain sensing element 110 is provided on the film body 133 as described above in regard to FIG. 2A and FIG. 2B.

When the diaphragm is bent by receiving a pressure such as a sound pressure, the sensing unit 100 extracts the change in voltage in proportion to the change in the resistance value of the strain sensing element 110 disposed on the diaphragm. The sensing unit 100 is an audio signal change element that converts an audio signal to a voltage signal and outputs it, for example. Since the level of the output signal of the sensing unit 100 is relatively low, the output side of the sensing unit 100 is connected to the processing unit 210 including an amplifier (not shown). Thereby, the output signal of the sensing unit 100 is amplified.

Since the level of the output signal of the sensing unit 100 is relatively low, the output signal of the sensing unit 100 is vulnerable to external noise. Since the resistance of the spin valve film of the sensing unit 100 is changed by an external magnetic field, an external magnetic field such as the geomagnetic field may influence at least one of the magnetization of the magnetization free layer and the magnetization of the reference layer as external noise.

Thus, the strain sensing element 110 can sense the pressure caused by a strain generated on the film body 133 and sense the magnetic field.

In contrast, in the pressure sensor 310 according to the embodiment, the magnetic field sensing element 120 is provided on the support 131. In other words, the magnetic field sensing element 120 is provided on the outside of the film body 133. The support 131 does not bend like the diaphragm (the film body 133) even when it receives a pressure such as a sound pressure. Thus, the support 131 does not bend even when an external pressure is applied, and a strain is not generated in the magnetic field sensing element 120 provided on the support 131. Thereby, the magnetic field sensing element 120 does not sense the pressure.

On the other hand, the magnetic field sensing element 120 has a configuration similar to the configuration of the strain sensing element 110, and is influenced by an external magnetic field. The resistance of the spin valve film of the magnetic field sensing element 120 is changed by an external magnetic field. That is, the third magnetic layer 121 has a third magnetization. The fourth magnetic layer 122 has a fourth magnetic field. The relative angle between the direction of the third magnetization and the direction of the fourth magnetization changes in accordance with the external magnetic field. The electric resistance of the magnetic field sensing element 120 changes in accordance with the change in relative angle. In the magnetic field sensing element 120, an external magnetic field such as the geomagnetic field may influence at least one of the magnetization of the magnetization free layer and the magnetization of the reference layer as external noise.

Thus, the magnetic field sensing element 120 can sense the magnetic field, while not sensing the pressure.

Here, as described above in regard to FIG. 1, both the strain sensing element 110 and the magnetic field sensing element 120 are a magnetoresistance effect element. The configuration of the strain sensing element 110 is similar to the configuration of the magnetic field sensing element 120. Therefore, the same external magnetic field influences the strain sensing element 110 and the magnetic field sensing element 120. Therefore, the intensity (amplitude) of the output signal caused by the external magnetic field out of the output signal of the strain sensing element 110 is the same as the intensity of the output signal of the magnetic field sensing element 120. The frequency of the output signal caused by the external magnetic field out of the output signal of the strain sensing element 110 is the same as the frequency of the output signal of the magnetic field sensing element 120. The phase of the output signal caused by the external magnetic field out of the output signal of the strain sensing element 110 is the same as the phase of the output signal of the magnetic field sensing element 120.

Thereby, as shown in FIG. 1, the pressure sensor 310 according to the embodiment can input the output signal of the strain sensing element 110 and the output signal of the magnetic field sensing element 120 to the differential circuit 201 and process them, and can thereby eliminate the external magnetic field as external noise. The differential circuit 201 subtracts the output signal of the magnetic field sensing element 120 from the output signal of the strain sensing element 110, and outputs the difference between the output signal of the strain sensing element 110 and the output signal of the magnetic field sensing element 120.

Figure 6A:
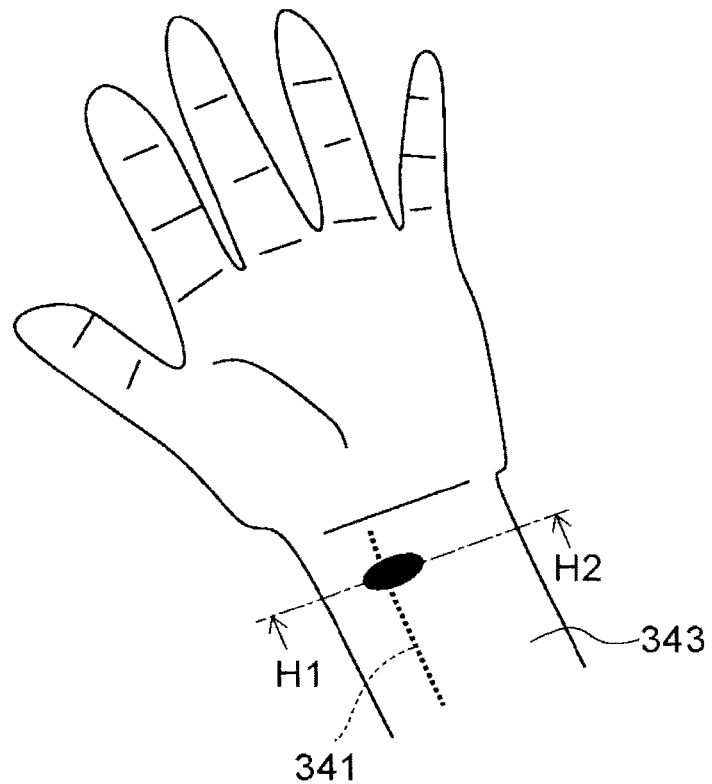
FIG. 6A and FIG. 6B are schematic views illustrating a blood pressure sensor according to the embodiment.
Figure 6B:
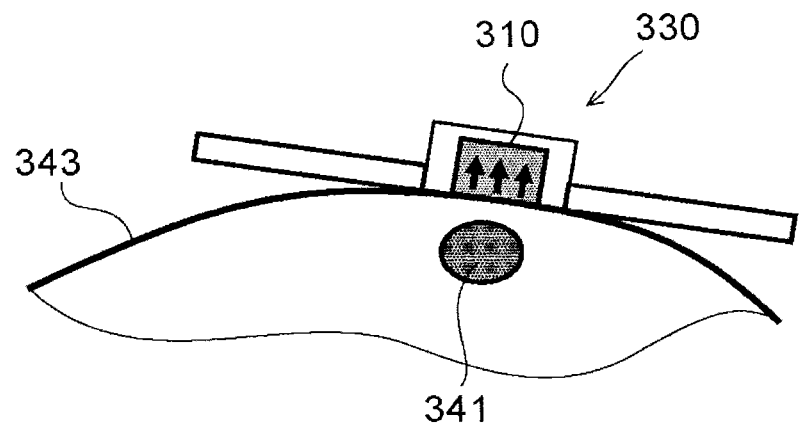

FIG. 6A and FIG. 6B are schematic views illustrating a blood pressure sensor according to the embodiment.

FIG. 6A is a schematic plan view illustrating the skin on an artery of a person. FIG. 6B is a cross-sectional view taken along plane H1-H2 of FIG. 6A.

A blood pressure sensor 330 according to the embodiment includes the pressure sensor 310 described above in regard to FIG. 1 to FIG. 5C. The blood pressure sensor 330 may include a pressure sensor according to a modification of the pressure sensor 310. The blood pressure sensor 330 shown in FIG. 6B includes the pressure sensor 310 as an example.

The blood pressure sensor 330 including the pressure sensor 310 etc. can eliminate the external magnetic field as external noise. The embodiment can provide a small-sized high-sensitivity blood pressure sensor 330.

Hence, as shown in FIG. 6B, a portion of the blood pressure sensor 330 where the pressure sensor 310 etc. are provided can be pressed against the skin 343 on an artery 341 easily. Consequently, continuous blood pressure measurement with high accuracy can be made.

Figure 7:
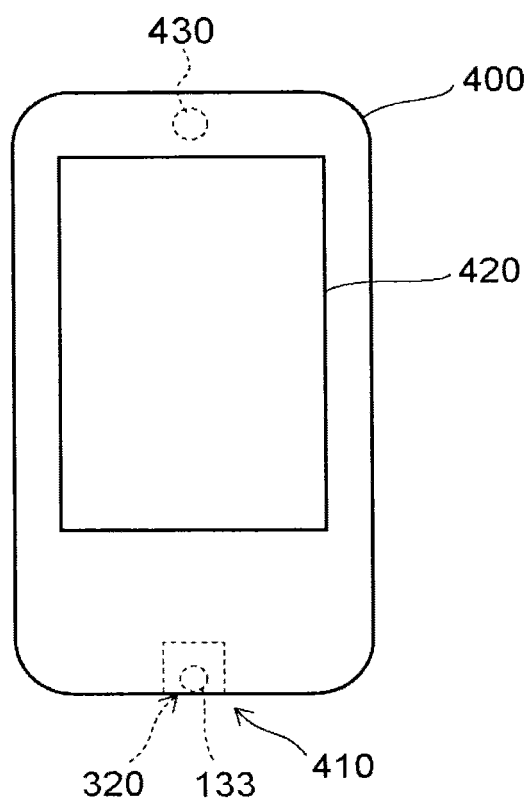
FIG. 7 is a schematic plan view illustrating a personal digital assistant according to the embodiment.

FIG. 7 is a schematic plan view illustrating a personal digital assistant according to the embodiment.

As shown in FIG. 7, a microphone 410 according to the embodiment is incorporated in a personal digital assistant 400, for example. The microphone 410 may be incorporated in an IC recorder and the like. The personal digital assistant 400 shown in FIG. 7 includes the microphone 410, a display unit 420, and a loudspeaker 430.

The microphone 410 is installed in an end portion of the personal digital assistant 400, and includes a pressure sensor 320. The loudspeaker 430 is installed in an end portion of the personal digital assistant 400 apart from the end portion where the microphone 410 is installed. The display unit 420 is provided between the microphone 410 and the loudspeaker 430.

The microphone 410 acquires the voice that the telephone talker utters, and outputs an audio signal.

A voice coil speaker is used ss the loudspeaker 430. The loudspeaker 430 outputs the audio signal of the person who talks with the telephone talker (the other person on the phone).

Figure 8A:
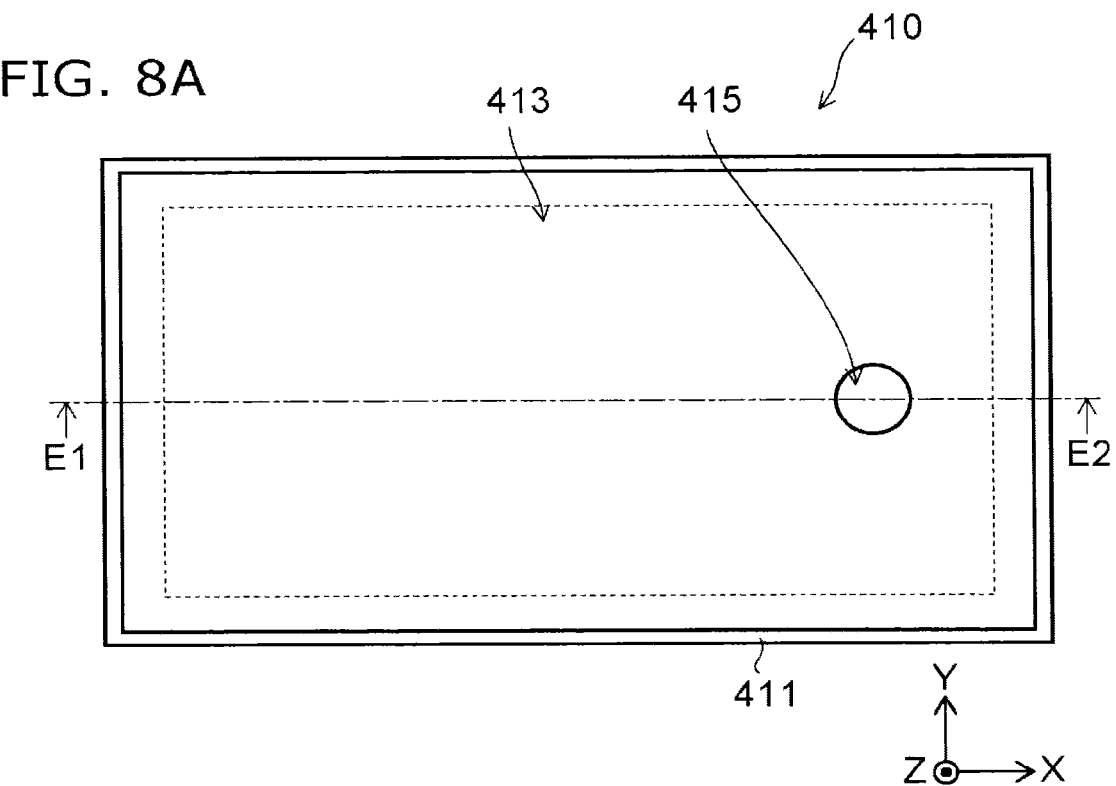
FIG. 8A and FIG. 8B are schematic views illustrating the microphone according to the embodiment.
Figure 8B:
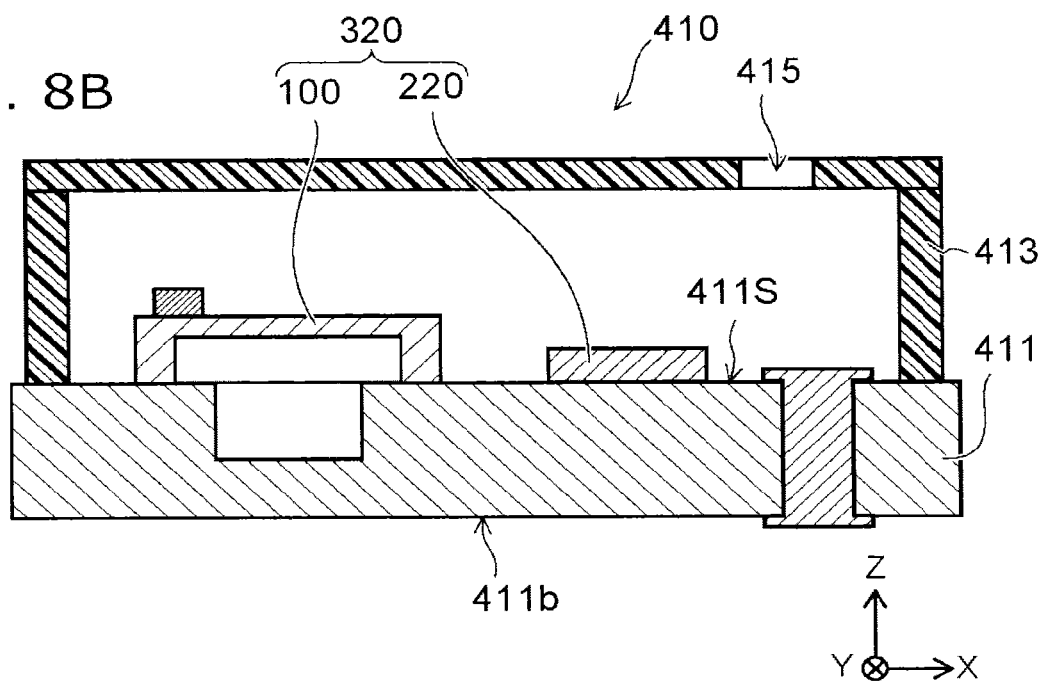

FIG. 8A and FIG. 8B are schematic views illustrating the microphone according to the embodiment.

Figure 9:
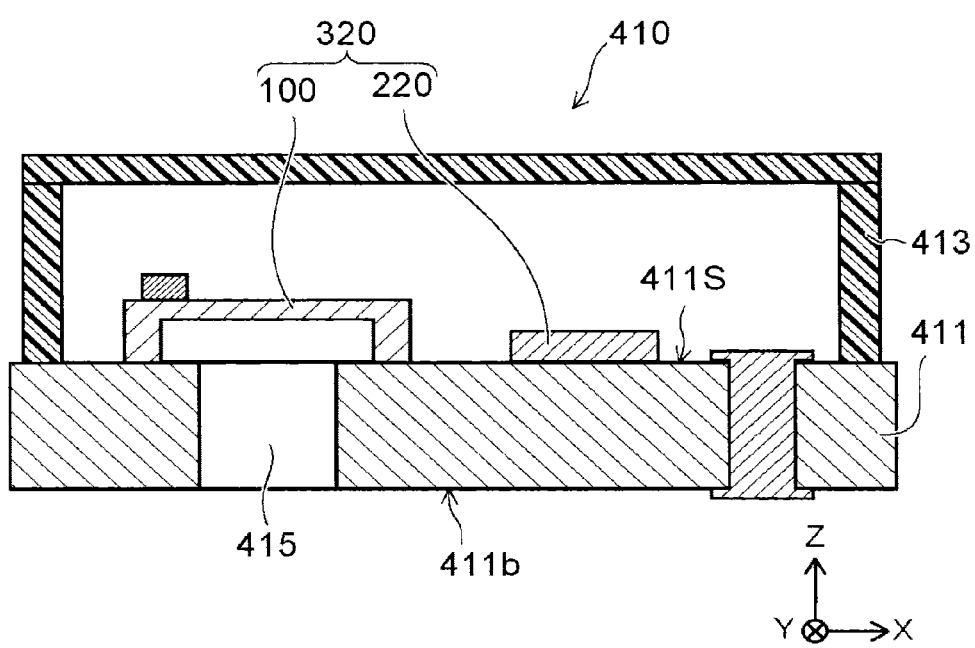
FIG. 9 is a schematic cross-sectional view illustrating another microphone according to the embodiment.

FIG. 9 is a schematic cross-sectional view illustrating another microphone according to the embodiment.

FIG. 8A is a schematic plan view illustrating the microphone according to the embodiment. FIG. 8B is a schematic cross-sectional view taken along plane E1-E2 shown in FIG. 8A.

The microphone 410 according to the embodiment is used for sound pressure sensors etc., for example.

The microphone 410 shown in FIG. 8A and FIG. 8B includes a mounting substrate 411, the pressure sensor 320, and a cover unit 413. The pressure sensor 320 includes the sensing unit 100 and a processing unit 220.

The mounting substrate 411 has a first surface 411s and a second surface 411b.

The direction perpendicular to the first surface 411s is defined as the Z-axis direction. One direction perpendicular to the Z-axis direction is defined as the X-axis direction. The direction perpendicular to the Z-axis direction and the X-axis direction is defined as the Y-axis direction. The second surface 411b is apart from the first surface 411s in the Z-axis direction.

The sensing unit 100 is provided on the first surface 411s. The sensing unit 100 is as described above in regard to FIG. 1 to FIG. 5C.

The processing unit 220 is provided on the first surface 411s.

The cover unit 413 is provided on the first surface 411s, and houses the sensing unit 100 and the processing unit 220. The mounting substrate 411 is provided with electrode pads.

In the specification of this application, the state of being "provided on" includes not only the state of being provided in direct contact but also the state of being provided via another component.

The cover unit 413 has a sound hole 415. The sound hole 415 is provided in an upper portion of the cover unit 413, for example, and penetrates through the upper portion. As shown in FIG. 9, the sound hole 415 may be provided in the mounting substrate 411. The sound hole 415 allows sound to pass through. The sound hole 415 transmits at least a sound outside the microphone 410 into the microphone 410 (to the inside of the cover unit 413), for example. The sound hole 415 causes at least a sound outside the microphone 410 to flow into (enter) the interior of the microphone 410 (the inside of the cover unit 413), for example.

In the personal digital assistant 400 shown in FIG. 7 etc., there is a case where the microphone 410 is provided in a position relatively close to the loudspeaker 430 because of the downsizing of the arrangement space etc. In this case, the audio signal of the other person on the phone outputted by the loudspeaker 430 may be inputted to the microphone 410. Consequently, the audio signal of the other person on the phone may be fed back, and an echo may occur. In other words, the voice of the other person on the phone may be heard from the loudspeaker of the personal digital assistant of the other person on the phone. If the loudspeaker 430 outputs an audio signal with a relatively large sound volume in hands-free telephone communication, the sound wave outputted from the loudspeaker 430 may be inputted to the microphone 410, and an echo may occur, for example.

In contrast, in the pressure sensor 320 according to the embodiment, the strain sensing element 110 is provided on the film body 133, and senses the pressure caused by a strain generated on the film body 133 and senses the magnetic field. The magnetic field sensing element 120 is provided on the support 131, and senses the magnetic field, while not sensing the pressure. The processing unit 220 inputs and processes the output signal of the strain sensing element 110 and the output signal of the magnetic field sensing element 120. When the signal resulting from a magnetic field (a magnetic field signal) is inputted to the microphone 410, the processing unit 220 identifies the magnetic field signal by comparing the output signal of the strain sensing element 110 and the output signal of the magnetic field sensing element 120, for example. Thereby, the pressure sensor 320 can output a signal with echoes suppressed. In other words, the pressure sensor 320 can make echo cancellation. The processing unit 220 is further described with reference to drawings.

Figure 10:
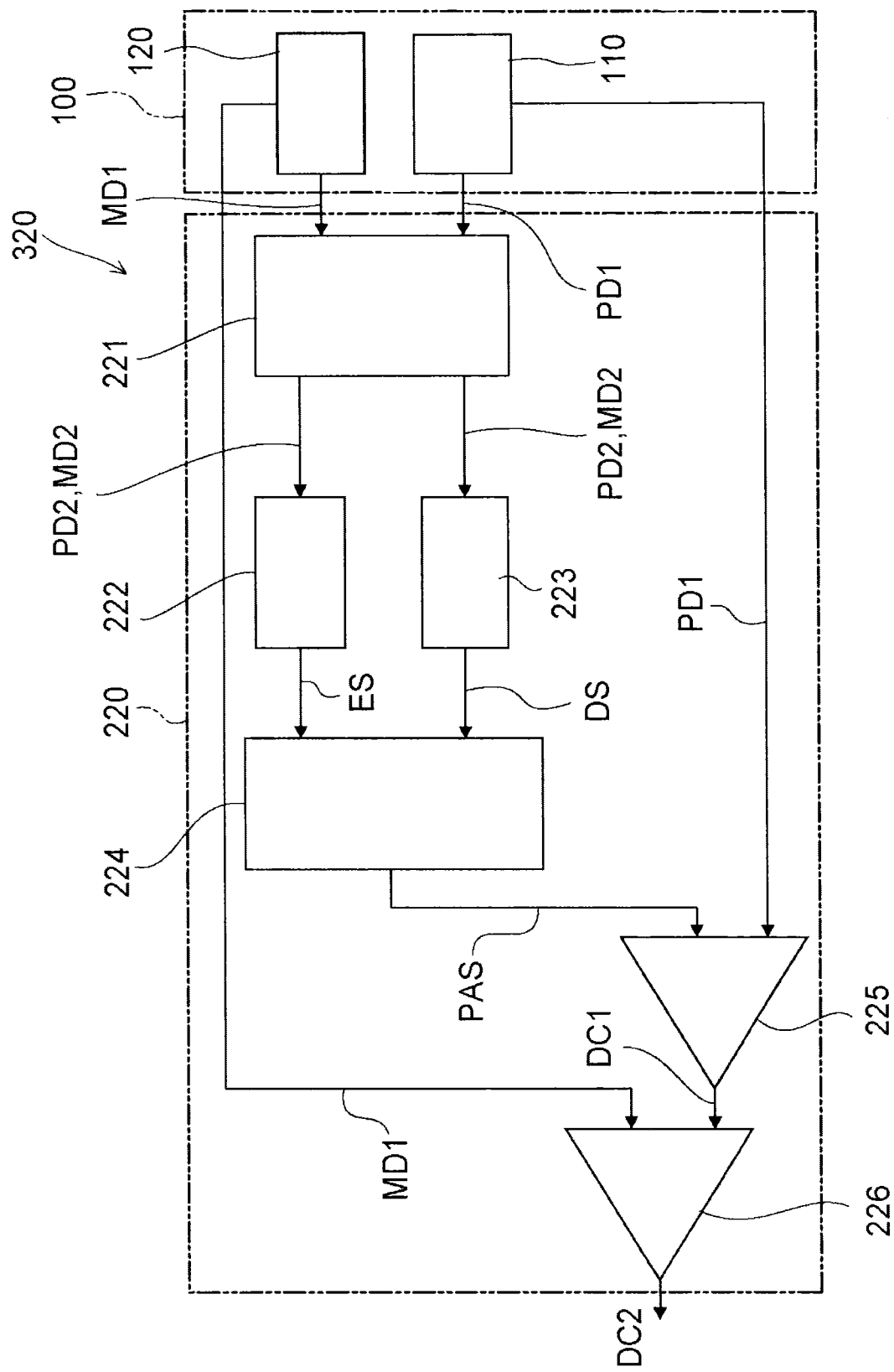
FIG. 10 is a block diagram illustrating the pressure sensor according to the embodiment.

FIG. 10 is a block diagram illustrating the pressure sensor according to the embodiment.

Figure 11:
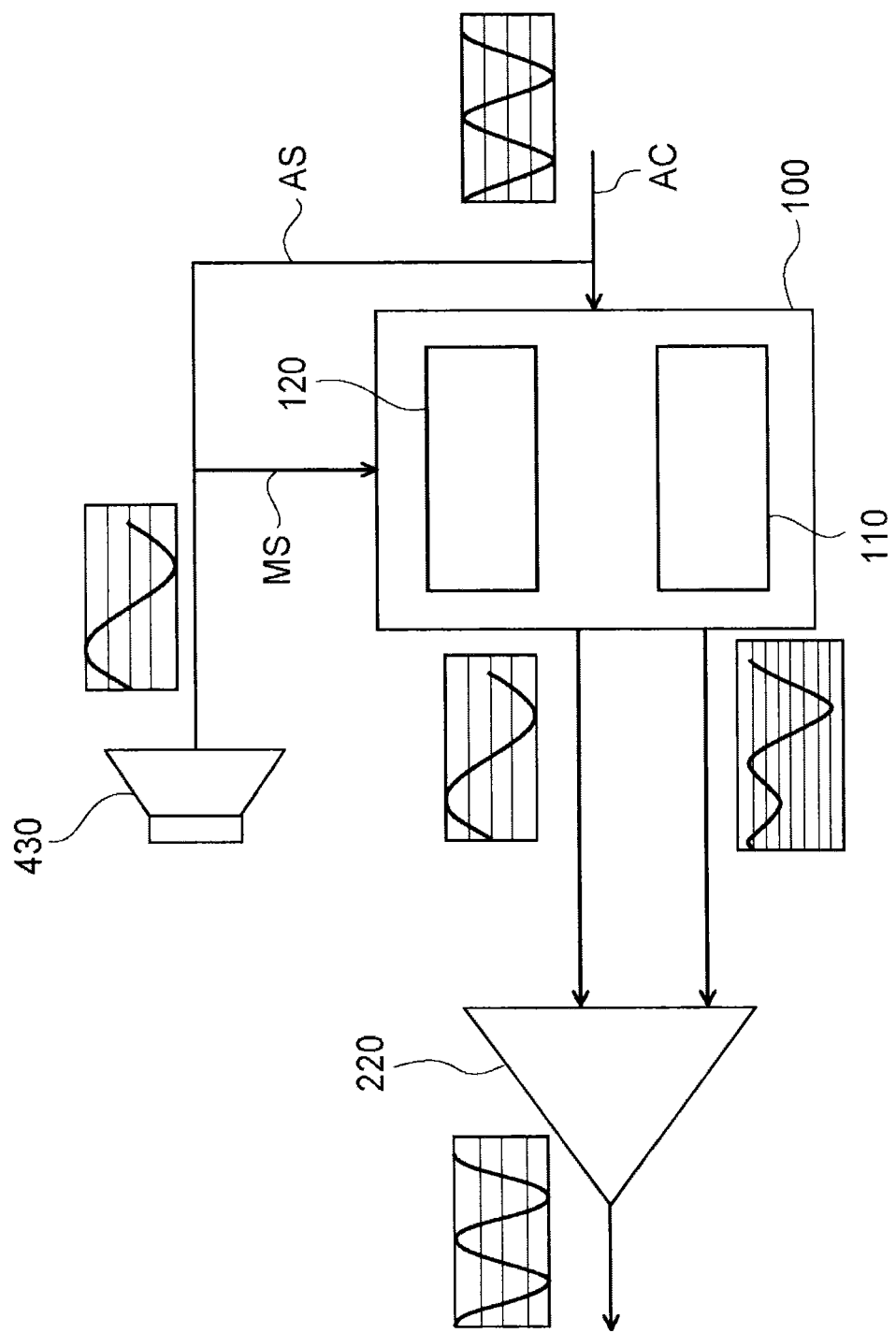
FIG. 11 is a block diagram illustrating the principle of echo cancellation of the embodiment.

FIG. 11 is a block diagram illustrating the principle of echo cancellation of the embodiment.

Figure 12:
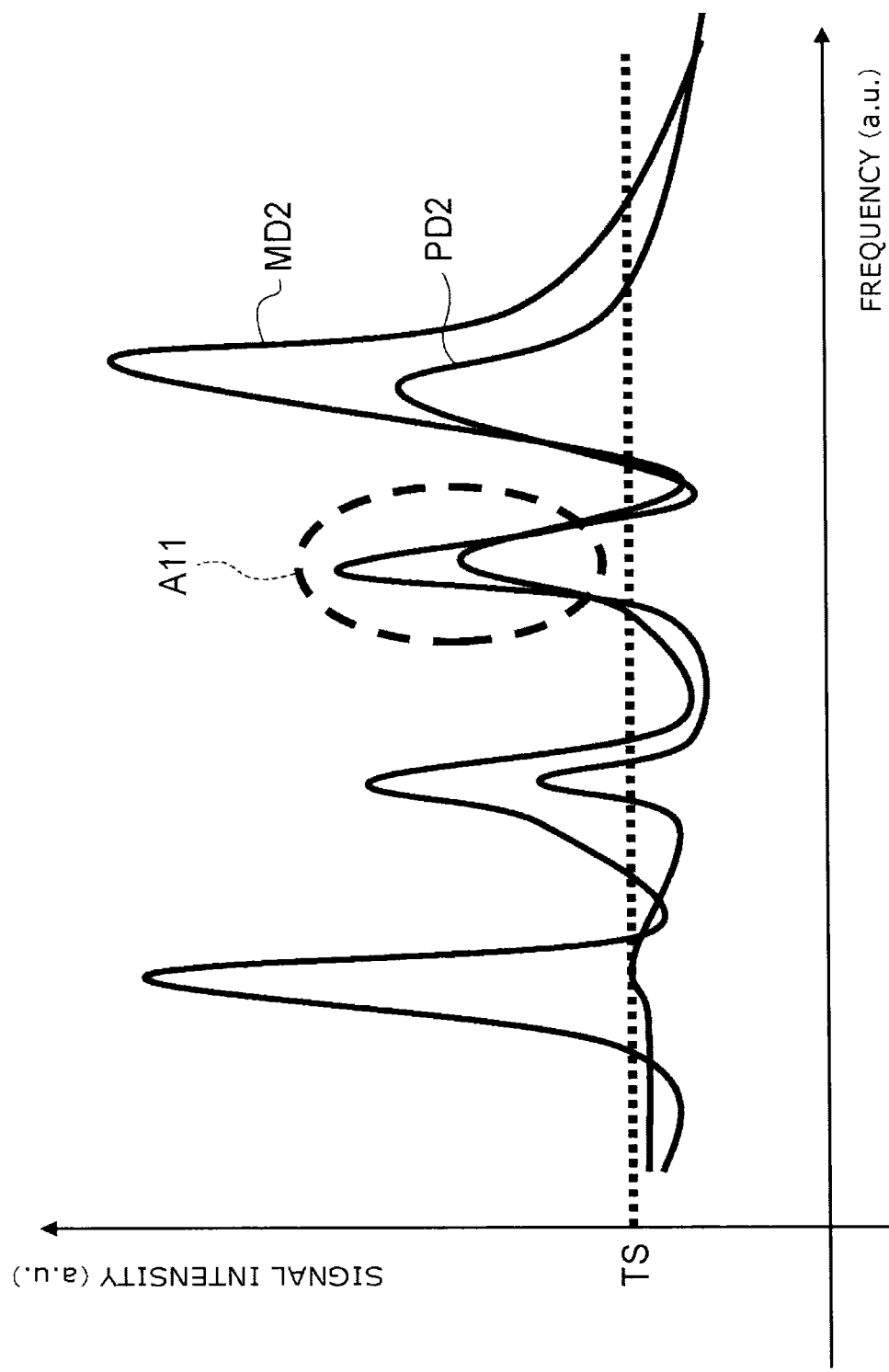
FIG. 12 is a graph describing the propagation correction factor of the embodiment.

FIG. 12 is a graph describing the propagation correction factor of the embodiment.

The horizontal axis of the graph shown in FIG. 12 represents frequency (a.u.; an arbitrary unit). The vertical axis of the graph shown in FIG. 12 represents the signal intensity (a.u.).

As shown in FIG. 10, the processing unit 220 of the embodiment includes a frequency domain transform unit 221, an echo intensity estimation unit 222, a delay estimation unit 223, a time domain transform unit 224, a first differential circuit 225, and a second differential circuit 226.

The frequency domain transform unit 221 transforms the time domain signal of the strain sensing element 110 to a frequency domain signal. The frequency domain transform unit 221 transforms the time domain signal of the magnetic field sensing element 120 to a frequency domain signal. Fourier transformation is used for the transformation from time to frequency. The frequency domain transform unit 221 includes a Fourier transform circuit.

The echo intensity estimation unit 222 identifies the frequency and the intensity (amplitude) of the audio signal outputted by the loudspeaker 430 out of the audio signal acquired by the strain sensing element 110.

The delay estimation unit 223 identifies the phase difference between the audio signal outputted by the loudspeaker 430 and the magnetic field signal outputted by the loudspeaker 430.

As described above in regard to FIG. 7, a voice coil speaker is used as the loudspeaker 430. The voice coil speaker includes a coil. The coil of the voice coil speaker is disposed between a first magnet (not shown) and a second magnet (not shown), and is connected to a diaphragm (not shown). The polarity of the first magnet is different from the polarity of the second magnet. When a current flows through the coil, an electromagnetic force is generated. Thereby, the diaphragm connected to the coil undergoes a displacement to output an audio signal. At this time, as shown in FIG. 11, a magnetic field signal MS having the same frequency as the frequency of the audio signal AS outputted by the voice coil speaker is generated around the voice coil speaker.

In the embodiment, the strain sensing element 110 senses the audio signal AS outputted by the loudspeaker 430, the magnetic field signal MS outputted by the loudspeaker 430, and the external magnetic field (noise). The strain sensing element 110 further senses sounds around the microphone 410 (including the voice of the telephone talker). The magnetic field sensing element 120 senses the magnetic field signal MS outputted by the loudspeaker 430 and the external magnetic field (noise).

As shown in FIG. 10, the output signal PD1 of the strain sensing element 110 and the output signal MD1 of the magnetic field sensing element 120 are inputted to the frequency domain transform unit 221. The output signal PD1 of the strain sensing element 110 includes the audio signal AS outputted by the loudspeaker 430, the magnetic field signal MS outputted by the loudspeaker 430, the surrounding audio signal AC, and the external magnetic field (noise). The output signal MD1 of the magnetic field sensing element 120 includes the magnetic field signal MS outputted by the loudspeaker 430 and the external magnetic field (noise).

The frequency domain transform unit 221 performs the Fourier transform of the output signal PD1 of the strain sensing element 110 to transform the time domain signal of the strain sensing element 110 (the output signal PD1) to a frequency domain signal PD2.

The frequency domain transform unit 221 performs the Fourier transform of the output signal MD1 of the magnetic field sensing element 120 to transform the time domain signal of the magnetic field sensing element 120 (the output signal MD1) to a frequency domain signal MD2.

As described above, the frequency of the audio signal AS outputted by the loudspeaker 430 is the same as the frequency of the magnetic field signal MS outputted by the loudspeaker 430.

On the other hand, the propagation manner of the audio signal AS outputted by the loudspeaker 430 is different from the propagation manner of the magnetic field signal MS outputted by the loudspeaker 430. That is, the audio signal AS outputted by the loudspeaker 430 propagates as a sound wave. The magnetic field signal MS outputted by the loudspeaker 430 propagates as a magnetic field. Therefore, the intensity of the audio signal AS outputted by the loudspeaker 430 is different from the intensity of the magnetic field signal MS outputted by the loudspeaker 430. Therefore, if the conditions do not change, the audio signal AS outputted by the loudspeaker 430 cannot be reproduced on the basis of the magnetic field signal MS outputted by the loudspeaker 430.

In contrast, in the embodiment, the frequency domain signal PD2 of the strain sensing element 110 is inputted to the echo intensity estimation unit 222. The frequency domain signal MD2 of the magnetic field sensing element 120 is inputted to the echo intensity estimation unit 222. The echo intensity estimation unit 222 finds the correction factor (propagation correction factor) for the difference in the propagation manner.

As shown in FIG. 12, the echo intensity estimation unit 222 finds the signal ratio (intensity ratio) between the intensity of the frequency domain signal PD2 of the strain sensing element 110 and the intensity of the frequency domain signal MD2 of the magnetic field sensing element 120 in a frequency band in which the intensity of the frequency domain signal PD2 of the strain sensing element 110 and the intensity of the frequency domain signal MD2 of the magnetic field sensing element 120 are not less than a prescribed threshold TS (excluding the frequency 0 hertz (Hz)), for example. The echo intensity estimation unit 222 determines as the propagation correction factor the minimum signal ratio out of the signal ratios between peaks at substantially the same frequencies. In other words, the echo intensity estimation unit 222 determines as the propagation correction factor the signal ratio in the position in which the intensity difference (amplitude difference) between peaks at substantially the same frequency is at the minimum. In the example of the graph shown in FIG. 12, the echo intensity estimation unit 222 determines as the propagation correction factor the signal ratio between peaks in region A11 shown in FIG. 12.

Thereby, the echo intensity estimation unit 222 can identify the intensity of the audio signal AS outputted by the loudspeaker 430. The echo intensity estimation unit 222 can identify the frequency of the audio signal AS outputted by the loudspeaker 430.

The prescribed threshold TS is determined by a signal intensity not less than the sensing limit of the strain sensing element 110 and a signal intensity not less than the sensing limit of the magnetic field sensing element 120.

The audio signal AS outputted by the loudspeaker 430 propagates at the speed of sound because it is a sound wave. The magnetic field signal MS outputted by the loudspeaker 430 propagates at the speed of light because it is an electromagnetic wave. Therefore, the time at which the audio signal AS outputted by the loudspeaker 430 reaches the sensing unit 100 is different from the time at which the magnetic field signal MS outputted by the loudspeaker 430 reaches the sensing unit 100. Consequently, a phase difference occurs between the audio signal AS outputted by the loudspeaker 430 and the magnetic field signal MS outputted by the loudspeaker 430. Therefore, if the conditions do not change, the audio signal AS outputted by the loudspeaker 430 cannot be reproduced on the basis of the magnetic field signal MS outputted by the loudspeaker 430.

In contrast, in the embodiment, the frequency domain signal PD2 of the strain sensing element 110 is inputted to the delay estimation unit 223. The frequency domain signal MD2 of the magnetic field sensing element 120 is inputted to the delay estimation unit 223. The delay estimation unit 223 identifies the phase difference between the frequency domain signal PD2 of the strain sensing element 110 and the frequency domain signal MD2 of the magnetic field sensing element 120. Thereby, the delay estimation unit 223 can identify the phase difference between the audio signal AS outputted by the loudspeaker 430 and the magnetic field signal MS outputted by the loudspeaker 430.

The frequency of the audio signal AS outputted by the loudspeaker 430, the intensity of the audio signal AS outputted by the loudspeaker 430, and the phase difference between the audio signal AS outputted by the loudspeaker 430 and the magnetic field signal MS outputted by the loudspeaker 430 can be identified by the processing by the frequency domain transform unit 221, the processing by the echo intensity estimation unit 222, and the processing by the delay estimation unit 223. Thereby, the audio signal AS outputted by the loudspeaker 430 out of the audio signal acquired by the strain sensing element 110 can be reproduced. In other words, the audio signal AS outputted by the loudspeaker 430 can be reproduced on the basis of the magnetic field signal MS outputted by the loudspeaker 430.

The output signal ES of the echo intensity estimation unit 222 is inputted to the time domain transform unit 224 as a frequency domain signal. The output signal DS of the delay estimation unit 223 is inputted to the time domain transform unit 224 as a frequency domain signal. The time domain transform unit 224 transforms the input signal (frequency domain signal) to a time domain signal, and produces a pseudo-speaker audio signal PAS that the loudspeaker 430 outputs, on the basis of the output signal ES of the echo intensity estimation unit 222 and the output signal DS of the delay estimation unit 223. The pseudo-speaker audio signal PAS is a pseudo-audio signal that it is estimated that the loudspeaker 430 outputs.

The pseudo-speaker audio signal PAS is inputted to the first differential circuit 225. Also the output signal PD1 of the strain sensing element 110 is inputted to the first differential circuit 225. The first differential circuit 225 subtracts the pseudo-speaker audio signal PAS from the output signal PD1 of the strain sensing element 110, and outputs the difference between the output signal PD1 of the strain sensing element 110 and the pseudo-speaker audio signal PAS. Thereby, the pseudo-speaker audio signal PAS in the output signal PD1 of the strain sensing element 110 is eliminated.

The output signal DC1 of the first differential circuit 225 is inputted to the second differential circuit 226. Also the output signal MD1 of the magnetic field sensing element 120 is inputted to the second differential circuit 226.

As described above in regard to FIG. 8A and FIG. 8B, the strain sensing element 110 senses pressure and magnetic fields. Therefore, there is a case where the output signal DC1 of the first differential circuit 225 includes a magnetic field signal.

Thus, the second differential circuit 226 subtracts the output signal MD1 of the magnetic field sensing element 120 from the output signal DC1 of the first differential circuit 225, and outputs the difference between the output signal DC1 of the first differential circuit 225 and the output signal MD1 of the magnetic field sensing element 120 (an output signal DC2). Thereby, the output signal MD1 of the magnetic field sensing element 120 in the output signal DC1 of the first differential circuit 225 (the magnetic field signal MS outputted by the loudspeaker 430 and the external magnetic field) is eliminated.

By the embodiment, the pressure sensor 320 can output a signal with echoes suppressed. Thereby, a personal digital assistant 400 in which the occurrence of echoes is suppressed can be provided.

Figure 13A:
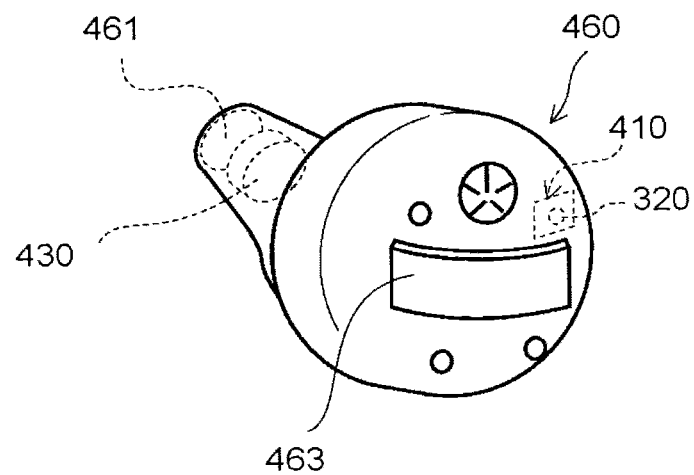
FIG. 13A and FIG. 13B are schematic diagrams illustrating a hearing aid according to the embodiment.
Figure 13B:
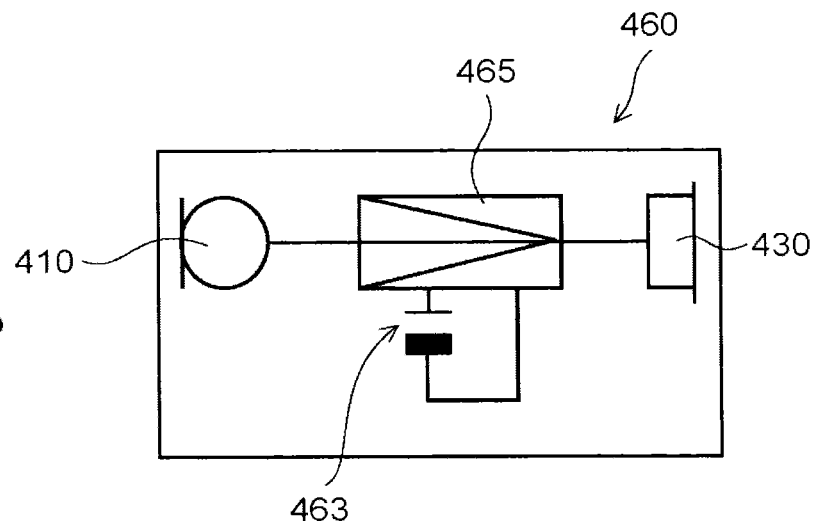

FIG. 13A and FIG. 13B are schematic diagrams illustrating a hearing aid according to the embodiment. FIG. 13A is a schematic perspective view illustrating the hearing aid according to the embodiment. FIG. 13B is a block diagram illustrating the hearing aid according to the embodiment.

As shown in FIG. 13A and FIG. 13B, the microphone 410 according to the embodiment is incorporated in a hearing aid 460, for example. The hearing aid 460 shown in FIG. 13A and FIG. 13B includes the microphone 410, the loudspeaker 430, a battery 463, and an amplifier 465. A voice coil speaker is used as the loudspeaker 430.

The microphone 410 is installed in the hearing aid 460, and includes the pressure sensor 320. The amplifier 465 may be included in the processing unit 220 of the pressure sensor 320. The microphone 410 acquires the surrounding sounds, and outputs an audio signal. The audio signal of the microphone 410 is inputted to the amplifier 465, and is amplified by the amplifier 465. The audio signal amplified by the amplifier 465 is inputted to the loudspeaker 430. The loudspeaker 430 outputs an audio signal to the outside through a sound hole 461.

The microphone 410, the pressure sensor 320, and the loudspeaker 430 are as described above in regard to FIG. 7 to FIG. 12.

By the embodiment, the pressure sensor 320 can output a signal with echoes suppressed. Thereby, a hearing aid 460 in which the occurrence of echoes is suppressed can be provided.

Figure 14:
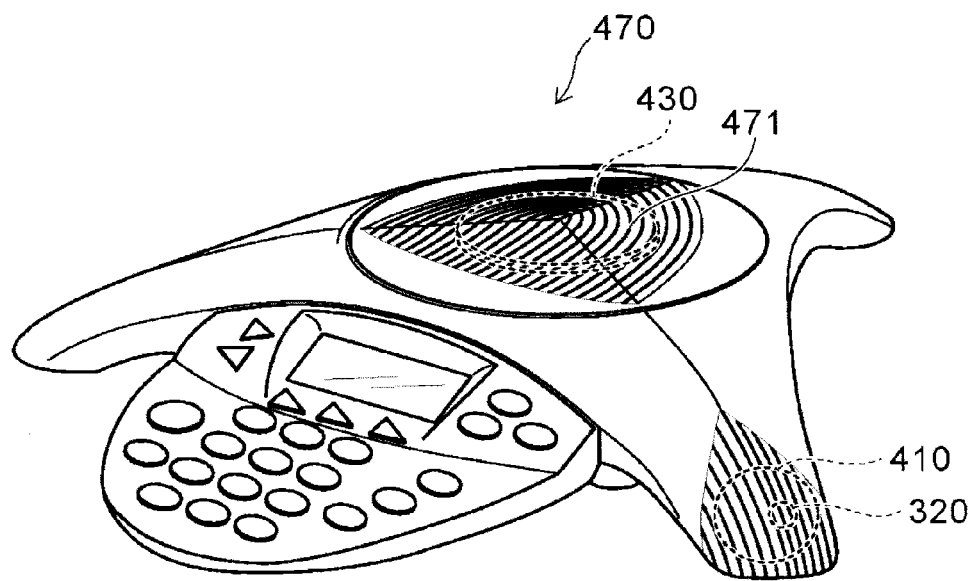
FIG. 14 is a schematic perspective view illustrating a telephone conference system according to the embodiment.

FIG. 14 is a schematic perspective view illustrating a telephone conference system according to the embodiment.

As shown in FIG. 14, the microphone 410 according to the embodiment is incorporated in a telephone conference system 470, for example. The telephone conference system 470 shown in FIG. 14 includes the microphone 410 and the loudspeaker 430. A voice coil speaker is used as the loudspeaker 430.

The microphone 410 is installed in the telephone conference system 470, and includes the pressure sensor 320. The microphone 410 acquires the surrounding sounds, and outputs an audio signal. The loudspeaker 430 outputs an audio signal to the outside through a sound hole 471.

The microphone 410, the pressure sensor 320, and the loudspeaker 430 are as described above in regard to FIG. 7 to FIG. 12.

By the embodiment, the pressure sensor 320 can output a signal with echoes suppressed. Thereby, a telephone conference system 470 in which the occurrence of echoes is suppressed can be provided.

In the specification of this application, "perpendicular" and "parallel" refer to not only strictly perpendicular and strictly parallel but also include, for example, the variation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may appropriately select specific configurations of components of pressure sensors 310 and 320 such as magnetic layers, nonmagnetic layers, film bodies, and supports from known art and similarly practice the invention. Such practice is included in the scope of the invention to the extent that similar effects thereto are obtained.

The description of the embodiment uses as an example the case where the pressure sensors 310 and 320 are used for the blood pressure sensor 330, the personal digital assistant 400, and the microphone 410. However, the use of the pressure sensors 310 and 320 is not limited to them, and may be used also for speakerphones, for example.

Further, any two or more components of the specific examples may be combined within the extent of technical feasibility; and such combinations are included in the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A strain sensor comprising:
   a base including a first part and a second part, a thickness of the first part being thinner than a thickness of the second part;
   a first sensing element provided on the first part and including:
      a first magnetic layer having a first magnetization;
      a second magnetic layer having a second magnetization; and
      a first intermediate layer provided between the first magnetic layer and the second magnetic layer;
   a second sensing element provided on the second part and including:
      a third magnetic layer having a third magnetization;
      a fourth magnetic layer having a fourth magnetization; and a second intermediate layer provided between the third magnetic layer and the fourth magnetic layer
a processing unit configured to process a first output signal of the first sensing element and a second output signal of the second sensing element.

2. A pressure sensor comprising a strain sensor,
the strain sensor including:
a base including a first part and a second part, a thickness of the first part being thinner than a thickness of the second part;
a first sensing element provided on the first part and including:
a first magnetic layer having a first magnetization;
a second magnetic layer having a second magnetization; and
a first intermediate layer provided between the first magnetic layer and the second magnetic layer;
a second sensing element provided on the second part and including:
a third magnetic layer having a third magnetization;
a fourth magnetic layer having a fourth magnetization; and
a second intermediate layer provided between the third magnetic layer and the fourth magnetic layer; and
a processing unit configured to process a first output signal of the first sensing element and a second output signal of the second sensing element.

3. The pressure sensor according to claim 2, wherein
the second sensing element senses a magnetic field, and
the first sensing element senses the magnetic field.

4. The pressure sensor according to claim 2, wherein the processing unit is configured to output a signal corresponding to a difference between the first output signal and the second output signal.

5. The pressure sensor according to claim 2, wherein
the processing unit includes:
an intensity estimation unit that finds a correction factor on the basis of an intensity ratio between an intensity of the first output signal and an intensity of the second output signal;
a delay estimation unit that finds a phase difference between a signal based on a part of a pressure applied to the first part and a signal based on a magnetic field applied to the second sensing element;
a transform unit that produces a pseudo-signal by means of an output signal of the intensity estimation unit and an output signal of the delay estimation unit;
a first differential circuit that executes processing of subtracting the pseudo-signal from the first output signal; and
a second differential circuit that executes processing of subtracting the second output signal from an output signal of the first differential circuit.

6. The pressure sensor according to claim 5, wherein the signal based on the magnetic field is a magnetic field signal that a voice coil speaker outputs.

7. The pressure sensor according to claim 5, wherein the signal based on the part of the pressure is an audio signal that a voice coil speaker outputs.

8. The pressure sensor according to claim 5, wherein the intensity estimation unit sets as the correction factor a minimum intensity ratio out of intensity ratios between a peak intensity of the first output signal and a peak intensity of the second output signal.

9. The pressure sensor according to claim 5, wherein the intensity estimation unit finds the intensity ratio in a frequency band,
an intensity of the first output signal being not less than a threshold in the frequency band and an intensity of the second output signal being not less than the threshold in the frequency band.

10. The pressure sensor according to claim 9, wherein the threshold is determined by a signal intensity not less than a sensing limit of the first element and a signal intensity not less than a sensing limit of the second sensing element.

11. The pressure sensor according to claim 2, wherein
the first magnetic layer, the first intermediate layer, and the second magnetic layer are arranged in a first direction from the first magnetic layer toward the second magnetic layer,
the third magnetic layer, the second intermediate layer, and the fourth magnetic layer are arranged in a second direction from the third magnetic layer toward the fourth magnetic layer,
a direction of the first magnetization crosses the first direction,
a direction of the second magnetization crosses the first direction,
a direction of the third magnetization crosses the second direction, and
a direction of the fourth magnetization crosses the second direction.

12. The pressure sensor according to claim 2, wherein
the first magnetic layer, the first intermediate layer, and the second magnetic layer are arranged in a first direction from the first magnetic layer toward the second magnetic layer,
the third magnetic layer, the second intermediate layer, and the fourth magnetic layer are arranged in a second direction from the third magnetic layer toward the fourth magnetic layer,
a direction of the first magnetization is along the first direction,
a direction of the second magnetization is along the first direction,
a direction of the third magnetization is along the second direction, and
a direction of the fourth magnetization is along the second direction.

13. The pressure sensor according to claim 2, wherein the first sensing element further includes:
a first electrode;
a second electrode, the first magnetic layer being provided between the first electrode and the second electrode, the second magnetic layer being provided between the first magnetic layer and the first electrode;
a buffer layer provided between the first electrode and the second magnetic layer; and
a cap layer provided between the first magnetic layer and the second electrode.

14. The pressure sensor according to claim 13, wherein the first sensing element further includes:
a first insulating region; and
a second insulating region separated from the first insulating region in a direction perpendicular to a direction from the first magnetic layer toward the second magnetic layer, the buffer layer, the second magnetic layer, the first intermediate layer, the first magnetic layer, and the cap layer being provided between the first insulating region and the second insulating region.

15. The pressure sensor according to claim 2, wherein the second sensing element further includes:
a first electrode;
a second electrode, the third magnetic layer being provided between the first electrode and the second electrode, the fourth magnetic layer being provided between the fourth magnetic layer and the first electrode;
a buffer layer provided between the first electrode and the fourth magnetic layer; and
a cap layer provided between the third magnetic layer and the second electrode.

16. The pressure sensor according to claim 15, wherein the second sensing element further includes:
a first insulating region; and
a second insulating region separated from the first insulating region in a direction perpendicular to a direction from the third magnetic layer toward the fourth magnetic layer, the buffer layer, the fourth magnetic layer, the second intermediate layer, the third magnetic layer, and the cap layer being provided between the first insulating region and the second insulating region.

17. A blood pressure sensor comprising a pressure sensor including a strain sensor,
the strain sensor including:
a base including a first part and a second part, a thickness of the first part being thinner than a thickness of the second part;
a first sensing element provided on the first part and including:
a first magnetic layer having a first magnetization;
a second magnetic layer having a second magnetization; and
a first intermediate layer provided between the first magnetic layer and the second magnetic layer;
a second sensing element provided on the second part and including:
a third magnetic layer having a third magnetization;
a fourth magnetic layer having a fourth magnetization; and
a second intermediate layer provided between the third magnetic layer and the fourth magnetic layer; and
a processing unit configured to process a first output signal of the first sensing element and a second output signal of the second sensing element.

18. A microphone comprising a pressure sensor including a strain sensor,
the strain sensor including:
a base including a first part and a second part, a thickness of the first part being thinner than a thickness of the second part;
a first sensing element provided on the first part and including:
a first magnetic layer having a first magnetization;
a second magnetic layer having a second magnetization; and
a first intermediate layer provided between the first magnetic layer and the second magnetic layer;
a second sensing element provided on the second part and including:
a third magnetic layer having a third magnetization;
a fourth magnetic layer having a fourth magnetization; and
a second intermediate layer provided between the third magnetic layer and the fourth magnetic layer; and
a processing unit configured to process a first output signal of the first sensing element and a second output signal of the second sensing element.

19. A personal digital assistant comprising a microphone including a pressure sensor,
the pressure sensor including a strain sensor,
the strain sensor including:
a base including a first part and a second part, a thickness of the first part being thinner than a thickness of the second part;
a first sensing element provided on the first part and including:
a first magnetic layer having a first magnetization;
a second magnetic layer having a second magnetization; and
a first intermediate layer provided between the first magnetic layer and the second magnetic layer;
a second sensing element provided on the base other than the second part and including:
a third magnetic layer having a third magnetization;
a fourth magnetic layer having a fourth magnetization; and
a second intermediate layer provided between the third magnetic layer and the fourth magnetic layer; and
a processing unit configured to process a first output signal of the first sensing element and a second output signal of the second sensing element.

20. A hearing aid comprising a microphone including a pressure sensor,
the pressure sensor including a strain sensor,
the strain sensor including:
a base including a first part and a second part, a thickness of the first part being thinner than a thickness of the second part;
a first sensing element provided on the first part and including:
a first magnetic layer having a first magnetization;
a second magnetic layer having a second magnetization; and
a first intermediate layer provided between the first magnetic layer and the second magnetic layer;
a second sensing element provided on the second part and including:
a third magnetic layer having a third magnetization;
a fourth magnetic layer having a fourth magnetization; and
a second intermediate layer provided between the third magnetic layer and the fourth magnetic layer; and
a processing unit configured to process a first output signal of the first sensing element and a second output signal of the second sensing element.

21. The strain sensor according to claim 1, wherein
the first part is deformable, and
the second part is not deformable.

22. The pressure sensor according to claim 2, wherein
a displacement of the first part when a pressure is applied to the first part is larger than a displacement of the second part when the pressure is applied to the second part.

23. The blood pressure sensor according to claim 17, wherein
a displacement of the first part when a pressure is applied to the first part is larger than a displacement of the second part when the pressure is applied to the second part.

24. The microphone according to claim 18, wherein
a displacement of the first part when a pressure is applied to the first part is larger than a displacement of the second part when the pressure is applied to the second part.

25. The personal digital assistant according to claim 19, wherein
a displacement of the first part when a pressure is applied to the first part is larger than a displacement of the second part when the pressure is applied to the second part.

26. The hearing aid according to claim 20, wherein
a displacement of the first part when a pressure is applied to the first part is larger than a displacement of the second part when the pressure is applied to the second part.

* * * * *